United States Patent [19]
Wiseman

[11] Patent Number: 5,168,446
[45] Date of Patent: Dec. 1, 1992

[54] SYSTEM FOR CONDUCTING AND PROCESSING SPOT COMMODITY TRANSACTIONS

[75] Inventor: James W. Wiseman, Princeton, N.J.

[73] Assignee: Telerate Systems Incorporated, Jersey City, N.J.

[21] Appl. No.: 356,449

[22] Filed: May 23, 1989

[51] Int. Cl.⁵ .................... G06F 15/20; G06G 7/52
[52] U.S. Cl. ................... 364/408; 340/825.26
[58] Field of Search .................. 364/408, 401; 340/825.26, 825.27

[56] References Cited

U.S. PATENT DOCUMENTS

| | | | |
|---|---|---|---|
| 2,159,107 | 5/1939 | Robinson | 340/825.26 |
| 3,310,782 | 3/1967 | Sinn et al. | 395/425 |
| 3,500,336 | 3/1970 | Cuccio | 395/101 |
| 3,573,747 | 4/1971 | Adams et al. | 340/825.27 |
| 3,587,053 | 6/1971 | Horzepa | 379/54 |
| 3,618,035 | 11/1971 | Sims, Jr. | 364/514 |
| 3,623,067 | 11/1971 | Deal, Jr. | 340/717 |
| 3,656,148 | 4/1972 | Belcher et al. | 340/717 |
| 3,716,835 | 2/1973 | Weinberg et al. | 340/825.27 |
| 3,801,961 | 4/1974 | Coombe | 340/724 |
| 3,806,649 | 4/1974 | Jinguji et al. | 379/94 |
| 3,946,158 | 3/1976 | Leclercq et al. | 379/53 |
| 4,000,371 | 12/1976 | Ogawa | 358/261.1 |
| 4,064,490 | 12/1977 | Nagel | 395/275 |

(List continued on next page.)

FOREIGN PATENT DOCUMENTS

| | | |
|---|---|---|
| 2139041 | 10/1984 | United Kingdom . |
| 2139042 | 10/1984 | United Kingdom . |
| 2139043 | 10/1984 | United Kingdom . |

OTHER PUBLICATIONS

"The Reuter Money Dealing Service," published by Reuters Limited, 1978.
"New Electronic Trading Service Will Revolutionize" Trading, Update, No. 3, Winter 1987, p. 1.
"The Trading Service TM ," published by Telerate, Inc., 1988.
"Conversation Protocols," The Coordinator, Version II, User's Guide, Appendix G, pp. 393-402, Action Technologies, Inc., 1984, 1988.
"What is the Coordinator?," The Coordinator, Version II, Introduction and Overview, pp. 3-5, Action Technologies, Inc., 1984, 1988.
"Reuters, Telerate Go Head to Head at Forex '88; Dealing 2000 to Offer Electronic Brokerage," Trading Systems Technology, vol. 1, No. 25, Jun. 6, 1988.

*Primary Examiner*—Robert Weinhardt
*Assistant Examiner*—Laura Brutman
*Attorney, Agent, or Firm*—Christopher P. Godziela; Charles B. Smith

[57] ABSTRACT

A system is provided for processing spot trades in selected commodities among a group of trading stations in a communication network through a series of structured stages. Each trading station is capable of initiating a transaction with any other trading station in the network by transmitting a request for a quotation on a selected commodity. The receiving, or counterparty, trading station responds by transmitting a quotation back to the initiating trader, and the trader transmits a proposal based on this quotation. The counterparty then transmits an acceptance of the proposal and upon receipt of this acceptance by the initiating trader, a confirmation signal is automatically transmitted back to the counterparty and the deal is automatically logged at both sites. Alterations of transmitted quotations and proposals and extensive negotiation are also possible. At each stage of a transaction, the responses available to the initiating trader or counterparty are limited or structured such that only certain responses are transmitted so that trades progress within the structure of the invention. The structure of the invention greatly improves operator ability to transact numerous trades accurately and quickly in a format that is readily processed by digital computers.

15 Claims, 32 Drawing Sheets

Microfiche Appendix Included
(2471 Microfiche, 40 Pages)

U.S. PATENT DOCUMENTS

| | | | |
|---|---|---|---|
| 4,071,697 | 1/1978 | Bushnell et al. | 379/88 |
| 4,150,254 | 4/1979 | Schussler et al. | 379/96 |
| 4,161,728 | 7/1979 | Insam | 340/750 |
| 4,213,124 | 7/1980 | Barda et al. | 340/706 |
| 4,233,628 | 11/1980 | Ciciora | 358/147 |
| 4,258,387 | 3/1981 | Lemelson et al. | 358/85 |
| 4,291,196 | 9/1981 | Spaniol et al. | 178/3 |
| 4,328,557 | 5/1982 | Gastinel | 395/800 |
| 4,338,492 | 7/1982 | Snopko | 379/110 |
| 4,349,701 | 9/1982 | Snopko | 379/110 |
| 4,356,509 | 10/1982 | Skerlos et al. | 358/85 |
| 4,371,871 | 2/1983 | Adams | 340/717 |
| 4,375,582 | 3/1983 | Gist et al. | 379/214 |
| 4,379,950 | 4/1983 | Ahmed | 379/269 |
| 4,388,489 | 6/1983 | Wigan et al. | 178/3 |
| 4,390,900 | 6/1983 | Van Kampen et al. | 358/147 |
| 4,394,649 | 7/1983 | Suchoff et al. | 340/711 |
| 4,404,551 | 9/1983 | Howse et al. | 340/711 |
| 4,412,287 | 10/1983 | Braddock, III | 364/408 |
| 4,414,621 | 11/1983 | Bown et al. | 395/153 |
| 4,418,382 | 11/1983 | Larson et al. | 395/200 |
| 4,430,639 | 2/1984 | Bennett | 340/310 A |
| 4,451,701 | 5/1984 | Bendig | 379/96 |
| 4,464,542 | 8/1984 | Baudoin et al. | 379/96 |
| 4,485,400 | 11/1984 | Lemelson et al. | 358/85 |
| 4,516,156 | 5/1985 | Fabris et al. | 358/85 |
| 4,525,779 | 6/1985 | Davids et al. | 395/153 |
| 4,531,184 | 7/1985 | Wigan et al. | 395/153 |
| 4,555,781 | 11/1985 | Baldry et al. | 370/60 |
| 4,600,808 | 7/1986 | Cosentino et al. | 379/96 |
| 4,674,044 | 6/1987 | Kalmus et al. | 364/408 |
| 4,677,552 | 6/1987 | Sibley, Jr. | 364/419 |
| 4,734,765 | 3/1988 | Okada et al. | 358/102 |
| 4,745,559 | 5/1988 | Willis et al. | 364/514 |
| 4,750,135 | 6/1988 | Boilen | 364/514 |
| 4,903,201 | 2/1990 | Wagner | 364/408 |
| 5,038,284 | 8/1991 | Kramer | 364/408 |

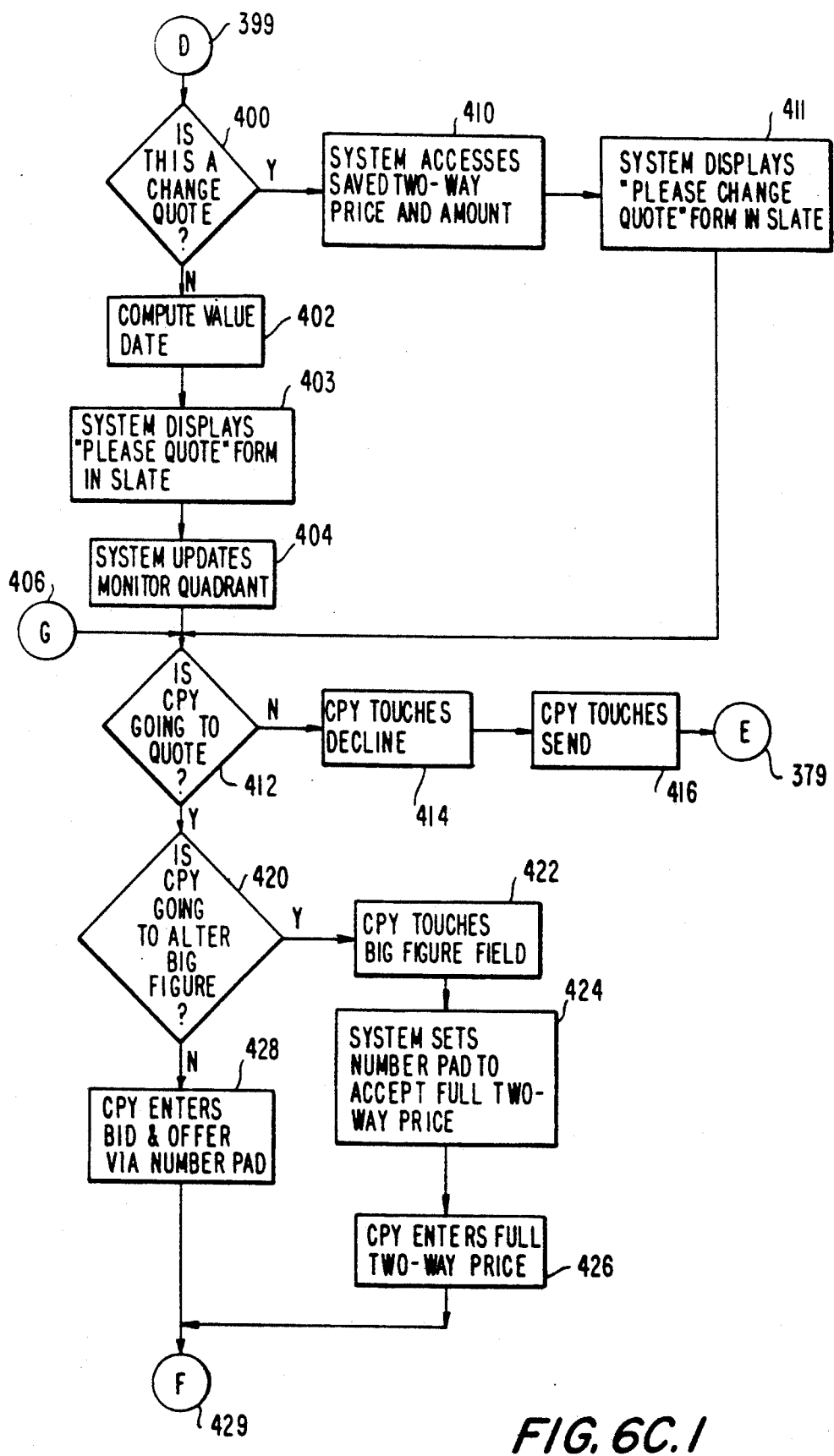
FIG. 6C.1

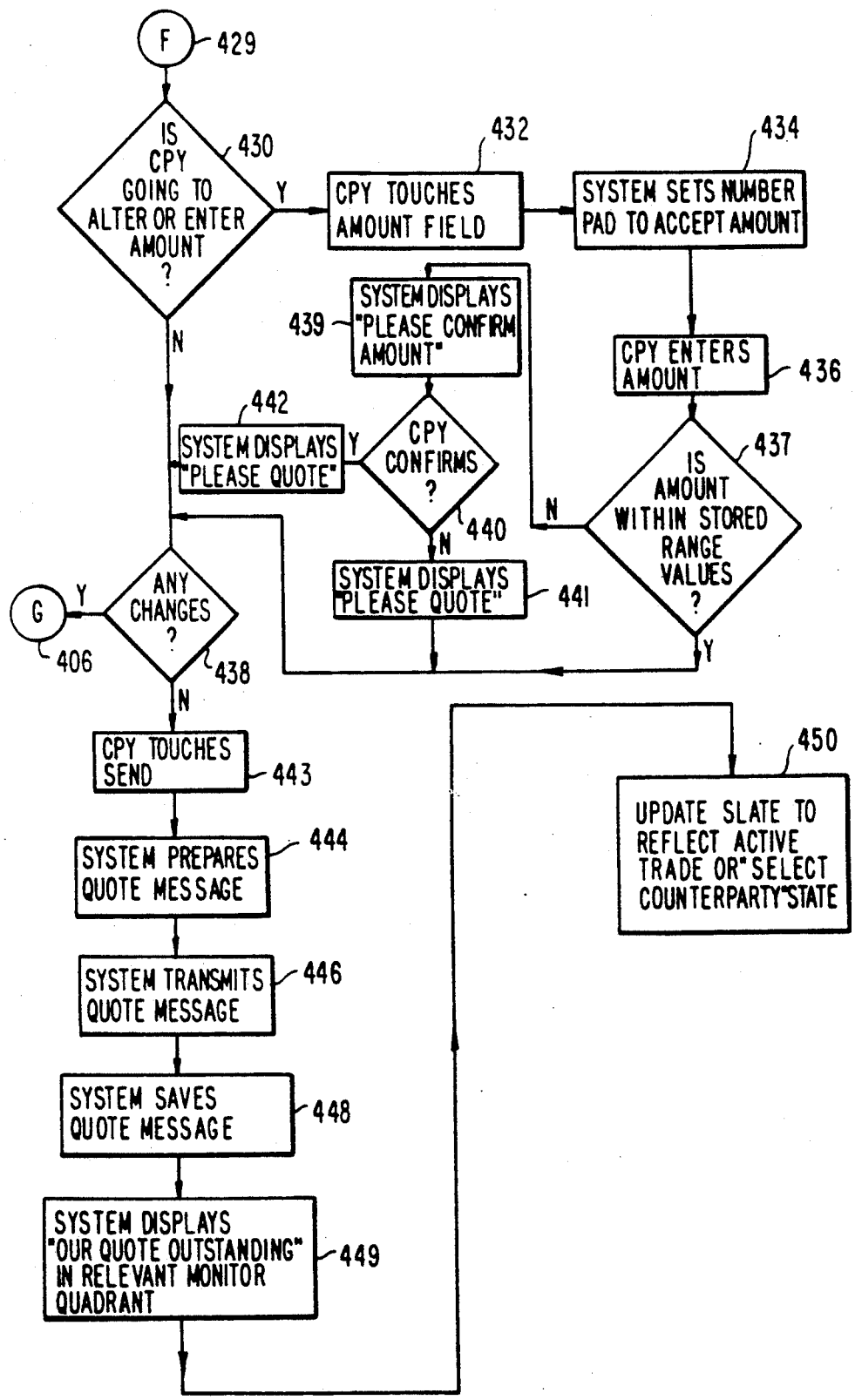
FIG.6C.2

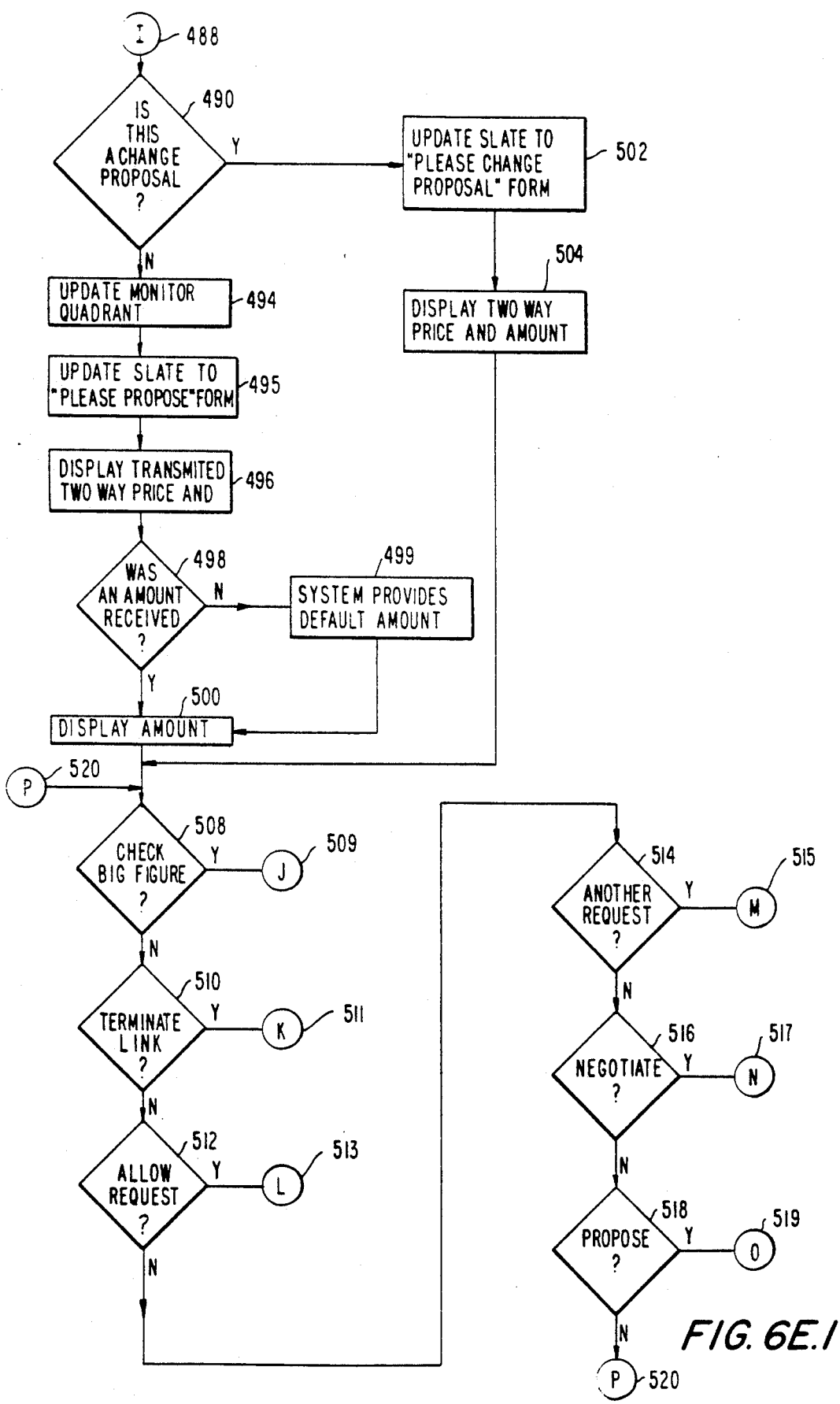
FIG. 6E.1

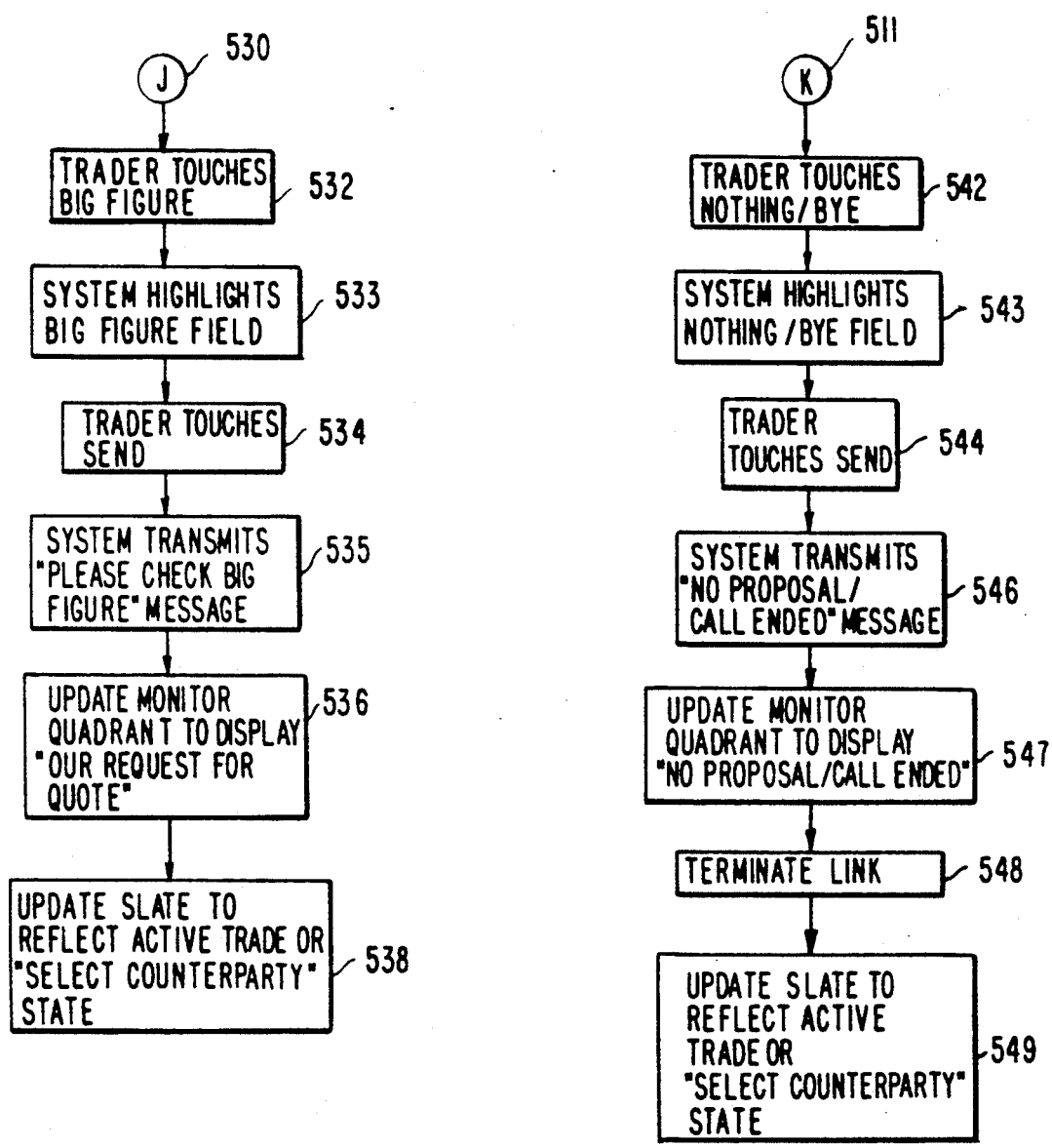
FIG. 6E.2

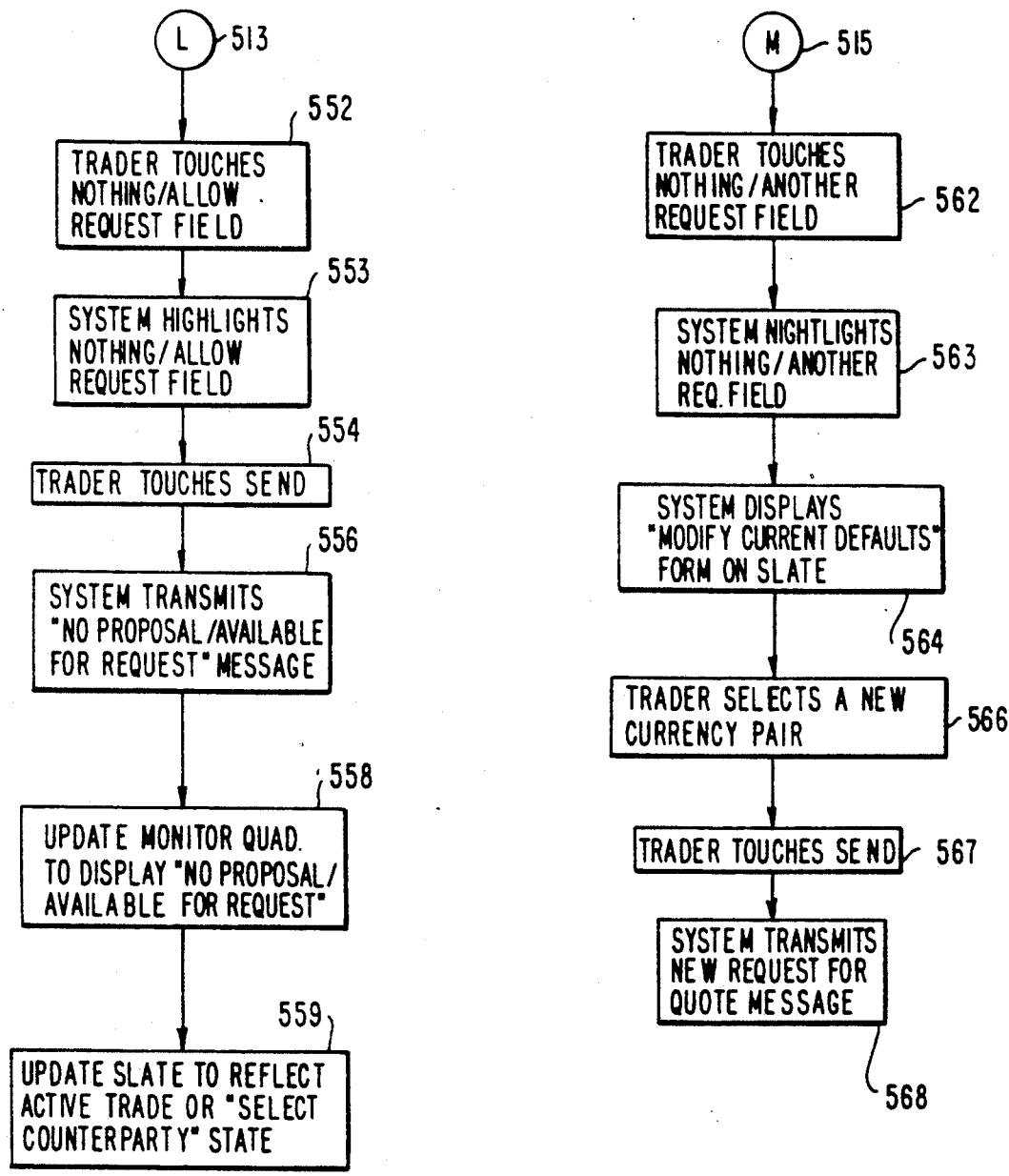
FIG. 6E.3

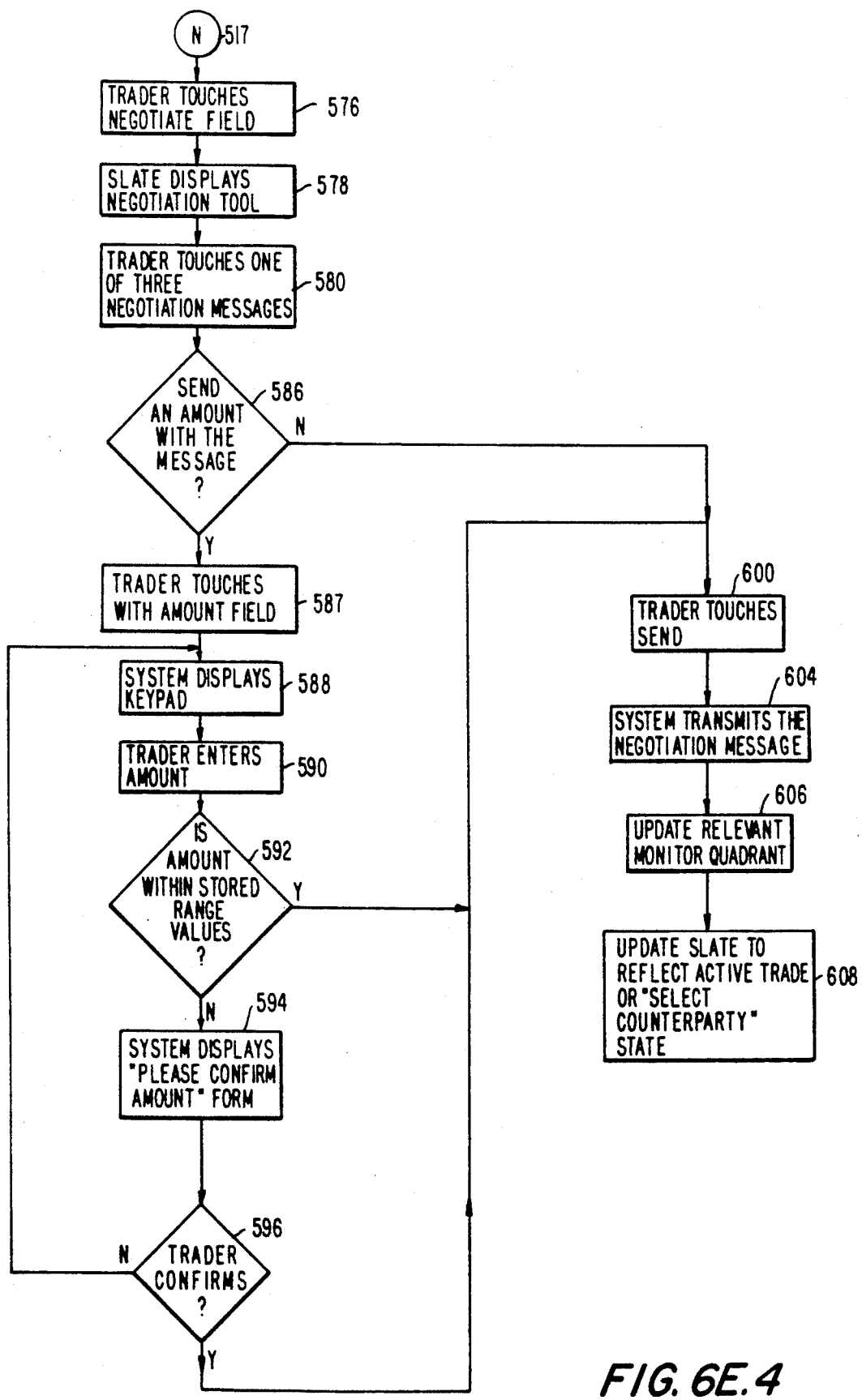
FIG. 6E.4

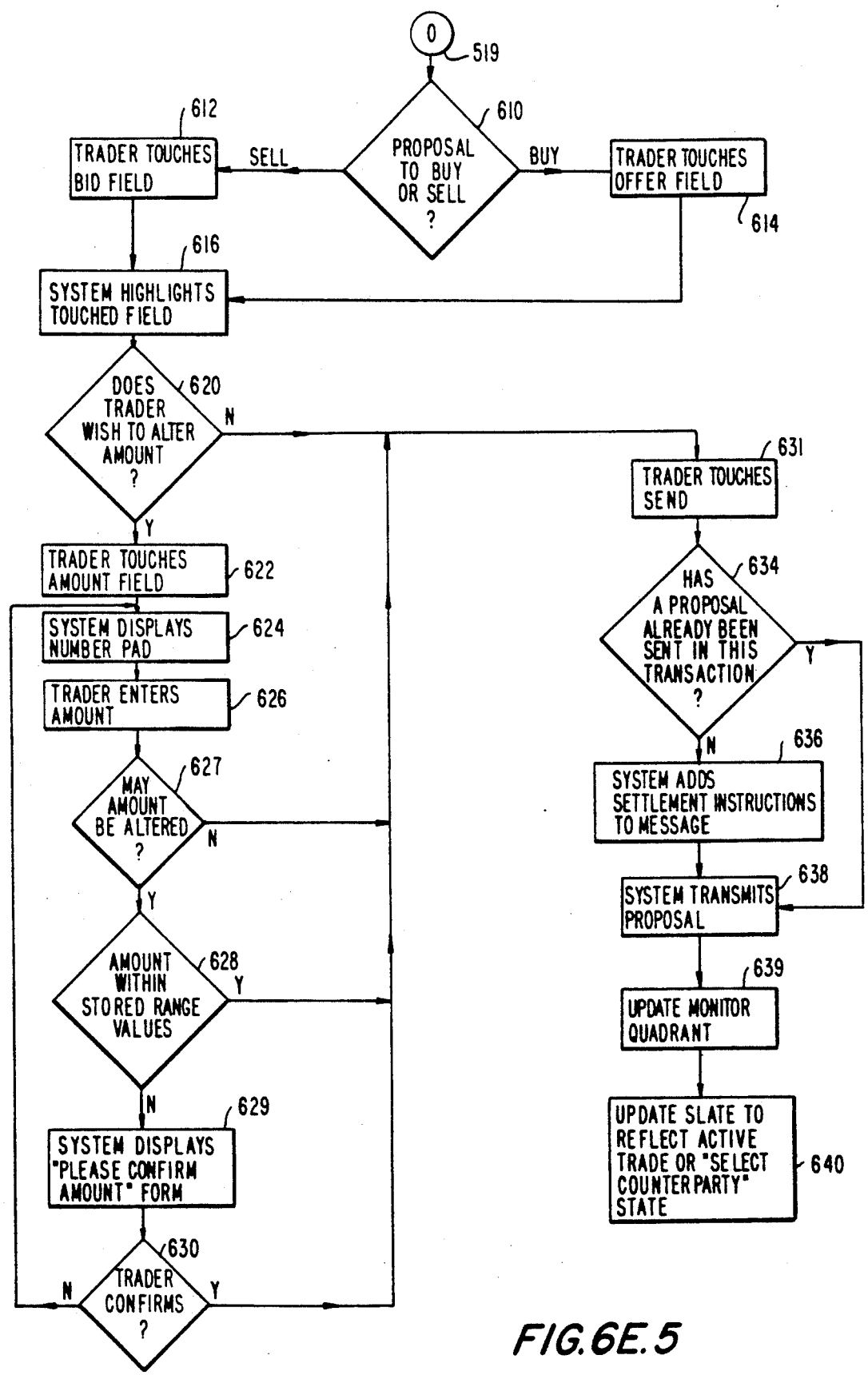
FIG.6E.5

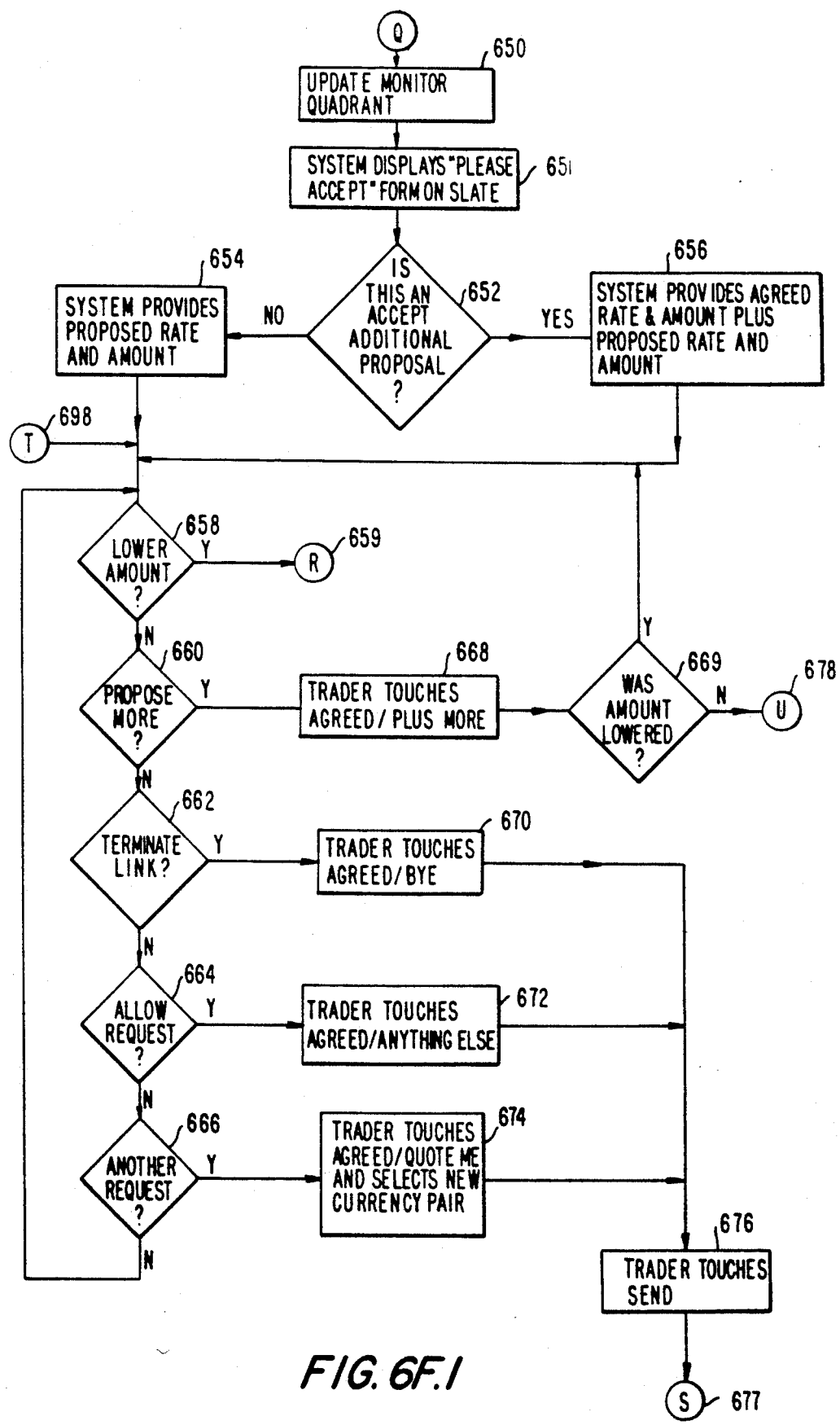
FIG. 6F.1

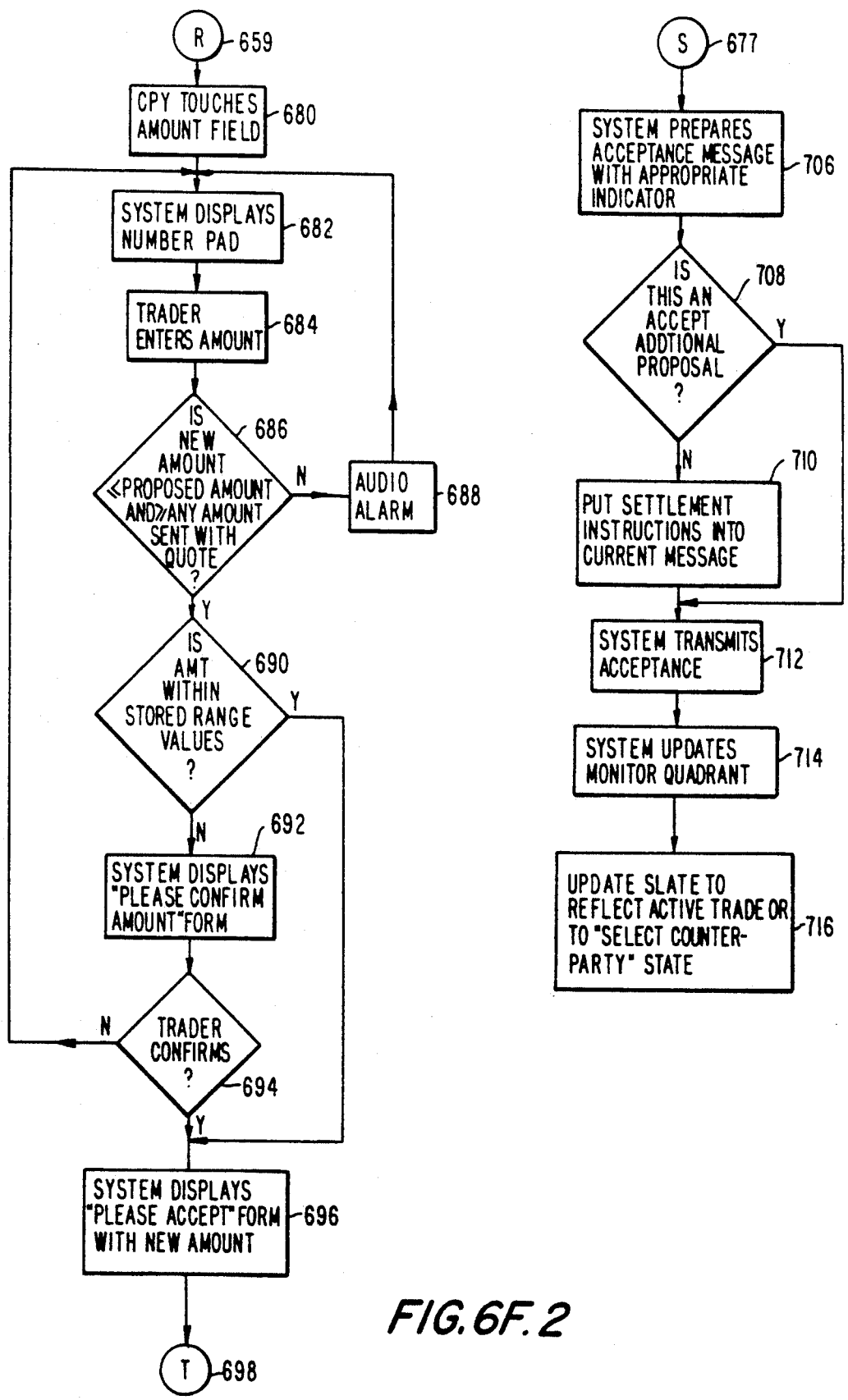
FIG.6F.2

```
L BANK LDN/FRED                         TODAY: MAY 12 '89
                                        VALUE: MAY 16 '89

THEY WILL QUOTE
                        STG/$

OUR REQUEST FOR QUOTE
```

*FIG. 8*

```
PLEASE CONFIRM AMOUNT $ 50,000,000
            [ NO ]    [ YES ]

[CANCEL] [OFFLINE  [ 1 ] [ 2 ] [CHANGE] [SEND]
          DEAL ]
[  Q  ]  [ MENU ]  [ 3 ] [ 4 ] [MODIFY]
```

*FIG. 11C*

```
1. ABCBANK      NY/JOE      STG/$     Sp
2. NATWEST      ZCH/ALFRED  $/SF      Sp
3.
4.
5.
6.
7.
8.
9.
10.
```

| POSITION | AVG RATE | P&L |
|---|---|---|
| +7.5M | 1.6705 | U0.007M |
|  |  | R0.011M |

FIG. 9

SELECT FROM QUEUE

```
1 ABC BANK  STG/$ Sp
  NY/JOE

2 NATWEST   $/SF  Sp
  ZCH/ALFRED
```

199a  199b
___DECLINE___
ALL | SELECT

| CANCEL | OFFLINE DEAL | 1 | 2 | CHANGE | ENTER |
| Q | MENU | 3 | 4 | MODIFY | |

FIG. 10

```
ABCBANK/JOE                    TODAY: MAY 12 '89
                               VALUE: MAY 16 '89

PLEASE QUOTE

STG/$

THEIR REQUEST FOR QUOTE
```

*FIG. 11A*

```
          PLEASE QUOTE
ABC BANK NY/JOE
            200  201  202    204     7    8    9
  WE      ┌────┬────┬────┐ ┌VALUE┐
 QUOTE    │1.67│    │    │ │5-15-89│    4    5    6
          └────┴────┴────┘ └─────┘
                                     1    2    3
 STG/$    ┌──────────────┐    205
          └──────────────┘              0
                203
                              206    B    .    M  ─208
          199c ─┌DECLINE┐     210 ─  C    ─    E  ─209

┌──────┐ ┌───────┐ ┌────┐ ┌────┐ ┌──────┐ ┌──────┐
│CANCEL│ │OFFLINE│ │  1 │ │  2 │ │CHANGE│ │      │
└──────┘ │ DEAL  │ └────┘ └────┘ └──────┘ │ SEND │
┌──────┐ └───────┘ ┌────┐ ┌────┐ ┌──────┐ │      │
│  Q   │ │ MENU  │ │  3 │ │  4 │ │MODIFY│ └──────┘
└──────┘ └───────┘ └────┘ └────┘ └──────┘
```

*FIG. 11B*

```
                SELECT DECLINE REASON
    DECLINE TO QUOTE
    BECAUSE:
         ┌─────┐                    ┌─────┐
         │  1  │  LINE FULL         │  5  │
         └─────┘                    └─────┘
         ┌─────┐                    ┌─────┐
211─┐    │ [2] │  CLOSED FOR TODAY  │  6  │
         └─────┘                    └─────┘
         ┌─────┐                    ┌─────┐
         │  3  │  NO INTEREST       │  7  │
         └─────┘                    └─────┘
         ┌─────┐                    ┌─────┐
         │  4  │                    │  8  │
         └─────┘                    └─────┘
    ┌────────┬────────┬─────┬─────┬────────┬──────┐
    │ CANCEL │OFFLINE │  1  │  2  │ CHANGE │      │
    │        │ DEAL   │     │     │        │ SEND │
    ├────────┼────────┼─────┼─────┼────────┤      │
    │   Q    │  MENU  │  3  │  4  │ MODIFY │      │
    └────────┴────────┴─────┴─────┴────────┴──────┘
```

*FIG. 12*

```
    ABC BANK NY/JOE              TODAY: MAY 12 '89
    DECLINE TO QUOTE BECAUSE:    VALUE: MAY 16 '89
    CLOSED FOR TODAY

STG/$

QUOTE DECLINED/CALL ENDED
```

*FIG. 13*

```
ABC BANK NY/JOE                    TODAY: MAY 12 '89
                                   VALUE: MAY 16 '89

WE QUOTE
                      STG/$
                     1.6710-20

OUR QUOTE OUTSTANDING
```

*FIG. 14A*

```
ABC BANK NY/JOE                    TODAY: MAY 12 '89
                                   VALUE: MAY 16 '89

WE QUOTE            CHANGE
                     STG/$
                    1.6710-20

OUR QUOTE CHANGING
```

*FIG. 14B*

```
L BANK LDN/FRED                          TODAY: MAY 12 '89
                                         VALUE: MAY 16 '89

THEY QUOTE

STG/$
                       1.6710 - 20

OUR QUOTE OUTSTANDING
```

*FIG. 15A*

```
              PLEASE   PROPOSE

L BANK LDN/FRED

THEY      1.67      10       20
     QUOTE

STG/$          5,000,000
  213   214                      215
                ------NOTHING------
  NEGOTIATE   ALLOW    ANOTHER    BYE     216
              REQUEST  REQUEST

CANCEL   OFFLINE    1       2      CHANGE
           DEAL                               SEND
    Q      MENU       3       4      MODIFY
```

```
ABCBANK NY/JOE                          TODAY: MAY 12 '89
                                        VALUE: MAY 16 '89

ON OUR QUOTE

WE BUY              STG/$                      WE SELL
  US$ 8,360,000                              STG 5,000,000
                      1.6720

STANDING INSTRUCTIONS

THEIR DEAL DEAL ACCEPTED/CALL ENDED
```

SYSTEM FOR CONDUCTING AND PROCESSING SPOT COMMODITY TRANSACTIONS

This specification includes a microfiche appendix of 40 microfiche and 2471 frames containing a computer program listing of the Spot Trading Program referred to herein.

The present invention relates to data processing systems, and particularly to systems for processing data relevant to the execution and logging of trades of various commodities.

BACKGROUND OF THE INVENTION

Systems for transacting trades of commodities are well known, such as those using the conventional telephone. These systems offer the rapid communication needed for trading in commodities with rapidly changing prices; however telephone based systems do not provide any hard copy records of a transaction. Hard copy records are essential to commodities traders as a means of documenting completed transactions. Furthermore, telephone based systems are mere communication systems and are unable to process data regarding a transaction to provide a trader with instantaneous information regarding all transactions performed within a given time period (such as a day) and the trader's cumulative position for a particular commodity.

Also well known are video telex based systems that essentially allow traders to exchange typed messages. While these systems can provide for the generation of hard copy records, rapid communication with another party is greatly inhibited by the need to manually type in lengthy text messages to be sent, and by the need to read all received messages. Network response time also suffers because of the length of the transmitted messages. The use of free text messages also makes it difficult for a single trader to simultaneously monitor the progress of more than one trade. An additional problem of video telex systems is that hard copy is generated for all messages sent and received; consequently, to find desired information or documentation, one must search entire "transcripts" of free text communications to find records documenting a desired communication, such as a final agreement to buy or sell a commodity. While attempts have been made to circumvent this problem by using a computer translator to scan the free text "transcripts" for certain key words that might indicate that an agreement has occurred, such computer translation systems are inherently unreliable and their translations must be constantly checked to verify their accuracy. Furthermore, the video telex systems of the prior art are incapable of monitoring input to prevent the transmission of gross input errors in quantities relevant to a transaction, such as price and volume.

By structuring the permitted trader input, the display output, the data messages themselves and the manner of trading, the present invention overcomes these disadvantages of the prior art. The structured trading of the present invention provides a sufficiently flexible environment to permit negotiation of complex trades while greatly reducing the data input needed from both traders and greatly enhancing comprehension of responses. Furthermore, the structured data transmissions of the present invention can be accurately processed by digital computers to create errorless records of a completed transaction. In a similar manner, the structured data transmissions can be monitored to reduce costly data entry errors that are possible when prices and amounts are being entered. Consequently, the applicants are not aware of any prior art systems capable of processing transactions in a structured manner that permits rapid, error free controlled negotiations between trading parties in a highly comprehensible manner and that can monitor traders and accurately and automatically document completed transactions.

SUMMARY OF THE INVENTION

The present invention relates to a system for processing transactions between commodity traders. The present invention provides a subscriber supervised, structured framework which greatly simplifies and decreases the manual input required of each of the parties to complete a transaction, and permits automatic, concurrent and instantaneous "capture" of all data required to produce an accurate deal ticket. At the same time, the structured framework is flexible enough to allow two trading parties to negotiate various aspects of complex commodity transactions. The term subscriber is used to represent a bank, brokerage house, securities dealer or other entity concerned with trading in commodities through one or more traders.

The system of the present invention comprises a network of trading stations, each of which comprises an input slate and a display screen. Each subscriber to the system has at least one such trading station at its subscriber site.

Each subscriber creates a profile for each of the traders that will use the system at the subscriber site. This profile indicates the commodities, counterparties, and maximum transactional amounts each trader sets to monitor gross input error. The profile also indicates whether the trader is a primary or secondary trader for incoming calls, and whether the trader can make outgoing calls.

The traders view the progress of each transaction on a video display screen. The screen is divided into a number of quadrants or sectors, e.g., four, to display the status of up to that number of trades at one time. The color of the foreground and background of each quadrant indicates the current stage of the displayed transaction within the structured framework. Monitor colors are also utilized to indicate whether the other party to the transaction is expecting a response from the trader viewing the monitor.

Traders interact with the system through a "slate" — a touch sensitive input device that displays various entry fields or "buttons" that are activated by touching the slate in the area where the button appears. The entry fields displayed on the slate change as a transaction progresses from one stage of the structured framework to the next. Consequently, the responses available to a trader change as the transaction progresses, and the responses available to the trader are limited to those displayed on the slate. In this manner, trades always proceed within the structured framework of the present invention, and the trader is always presented with a manageable number of input fields.

The system of the present invention transmits information in the form of structured data packets. Because the system transmits only a limited number of data message types, the data packets are structured to contain a field indicating the type of message (e.g., quote request or a proposal) and supporting fields supplying data identifying the particular commodity, transaction amount, price and counterparty. Each trading station is able to determine the contents of each field in a received message by accessing this data message type field; each data message type identifier that can be found in the data message type field is associated with a particular mapping of data fields of that message.

The structured framework of the present invention permits a trader, called the trading party or initiating trader, at a given trading station to contact another subscriber in the network to request a quotation with respect to a particular commodity. The trading party need only select a commodity (if it differs from a pre-set default commodity) and a party to trade with (a counterparty); the trading party then transmits the quote request to the counterparty. The trader's choice of commodities and counterparties is limited to those displayed on the slate, which in turn are determined by those listed in the trader's profile. The trader can optionally designate an amount in the quote request. The system checks to see if this amount is within a predesignated range that is stored in the trader's profile for the selected transaction. If the amount is not within the predesignated range, the trader is requested to confirm the amount before the quote request is transmitted.

This quote request can be answered by any trader at the selected subscriber site who is permitted (by his profile) to trade in the particular commodity. The call is initially sent to all traders of the selected commodity at the selected subscriber site who have primary status. If no traders with primary status at the selected subscriber site are logged on the system, the call is sent to traders with secondary status. A trading station that receives a call places it on an incoming calls queue from which a trader can randomly select it if he wishes to answer the call. The queue displays the identity of the party (the bank name and trader's first name) sending the quote request and the commodity for which a quote is requested. The answering trader is called the counterparty. The counterparty may selectively transmit a quotation in accordance with the request, or he may transmit a signal indicating that he does not want to quote a price. If the counterparty decides to transmit a quote after answering an incoming quote request, the counterparty then may enter bid and offer amounts corresponding to the prices at which he is willing to buy and sell the commodity. The counterparty can also enter an amount on which the quoted price is based, if the trader failed to do so, or the counterparty can change the amount that the trader transmitted with the quote request. The counterparty then transmits the quote to the trading party. As with the trader quote request, any amount entered is checked by the system against the predesignated range limits in the counterparty's profile. If the amount is not within the predesignated range, the counterparty is requested to confirm the amount before the quote request is transmitted.

The trading party may then make a proposal to either buy or sell a designated amount of the commodity at the quoted prices, or he may decline to continue the transaction and end the communication. The trading party may also seek to negotiate the terms of the quote by transmitting one of several pre-programmed responses to induce the counterparty to alter the bid or offer prices or change the amount of the transaction. Several rounds of such negotiations can occur. The counterparty may also change his quote at any time before the counterparty receives a proposal. Assuming that the trading party elects to propose a trade, he can propose to buy or sell the amount of the commodity, if any, that was transmitted with the quote, or any lesser amount, unless he transmitted a quote request on an exact amount that the counterparty quoted on. If no amount was transmitted with the quote, a default dealt amount will be supplied by the system based on data in the trader's profile. As with the quote request, any amount is checked against the range limits stored in the profile, and the trader is asked to confirm any amount outside of the range before transmitting the proposal.

After the trader transmits a proposal, the counterparty must accept the proposal. In one embodiment, however, the trader may change his proposal if the change signal the trader transmits is received by the counterparty before the counterparty transmits an acceptance. Before agreeing to the transaction, the counterparty may decrease the amount of the transaction; but if the counterparty quoted for a specific amount, he may not decrease the amount of the transaction below that amount. The amount is then checked against the stored range limits before transmission. When the trader's trading station receives an acceptance of the proposal, a signal acknowledging the receipt is automatically transmitted to the counterparty trading station. The network then transmits to the trader trading station a second acknowledgment signal confirming receipt of the original acknowledgment signal. The deal is logged as a completed transaction at each subscriber site upon receipt at the subscriber site of an acknowledgement signal.

At each subscriber site, each transmission except for a quote request and a decline to quote is logged. The structure of the data packets enables the system to monitor all requested transmissions and compare the fields indicating the commodity and amount to the upper and lower range limits in each Trader's Profile. Upon receiving an acknowledgement of a completed transaction, the system accesses the relevant fields of the logged transmissions of the completed transaction to determine: the other party to the transaction, the commodity, the price, the amount of the transaction and whether the trader at the subscriber site bought or sold the commodity. This information is then used to print up a ticket for the deal and to update the position of the subscriber in the relevant commodity. The information can also be transmitted electronically to other computer systems as desired.

In the preferred embodiment, the system checks the prices and amount in received messages against their respective values in the previous stage of the transaction. If any of the prices or the amount changes as a result of the received message, the receiving trading station sounds an audible alarm to alert the operator. Any price or amount which has changed is flashed on and off to highlight the changed quantity.

By using the structured framework of the present invention, spot transactions are transacted with only a few touches of an input slate by each trader, while the status of a transaction is displayed in a highly comprehensible manner. The use of structured data transmissions also enables a subscriber to safeguard against costly data entry errors and to automatically document completed transactions.

DESCRIPTION OF THE DRAWINGS

FIGS. 6A through 6G together comprise detailed schematic block diagrams of flow charts illustrating the sequence of control utilized in the system in response to various operator inputs to ensure that all trades are transacted in accordance with the structure of the present invention, an example of such a trade being depicted in the logic flow diagram shown in FIG. 5.

FIG. 8 is a diagrammatic illustration of a typical monitor quadrant display in the "Our Request For Quote" state of a transaction.

FIG. 9 is a diagrammatic illustration of a typical monitor quadrant display of the incoming calls queue where two calls are on the queue.

FIG. 10 is a diagrammatic illustration of the slate display in the SELECT FROM QUEUE state.

FIGS. 11A and 11B are diagrammatic illustrations of typical monitor quadrant and slate displays, respectively, in the PLEASE QUOTE state.

FIG. 11C is a diagrammatic illustration of the slate display in the PLEASE CONFIRM state.

FIG. 12 is a diagrammatic illustration of the slate display in the SELECT DECLINE REASON state.

FIG. 13 is a diagrammatic illustration of a typical monitor quadrant display in the "Quote Declined/Call Ended" state.

FIG. 14A is a diagrammatic illustration of a typical monitor quadrant display in the "Our Quote Outstanding" state.

FIG. 14B is a diagrammatic illustration of a typical monitor quadrant display in the "Our Quote Changing" state.

FIGS. 15A and 15B are diagrammatic illustrations of typical monitor quadrant and slate displays, respectively, in the PLEASE PROPOSE state.

FIG. 15C is a diagrammatic illustration of the slate display in the PLEASE PROPOSE state with the negotiation tool displayed.

FIG. 15D is a diagrammatic illustration of the slate display in the PLEASE CLOSE SPREAD state.

FIG. 19 is a diagrammatic illustration of a typical monitor quadrant display in the "Their Deal Accepted/Call Ended" state.

FIG. 20A is a diagrammatic illustration of the slate display in the AGREED - ENTER ADDITIONAL PROPOSAL state.

FIG. 20B is a diagrammatic illustration of a typical slate display in the PLEASE ACCEPT state after the "Quote Me" field has been touched.

DETAILED DESCRIPTION OF THE INVENTION

Figure 1:
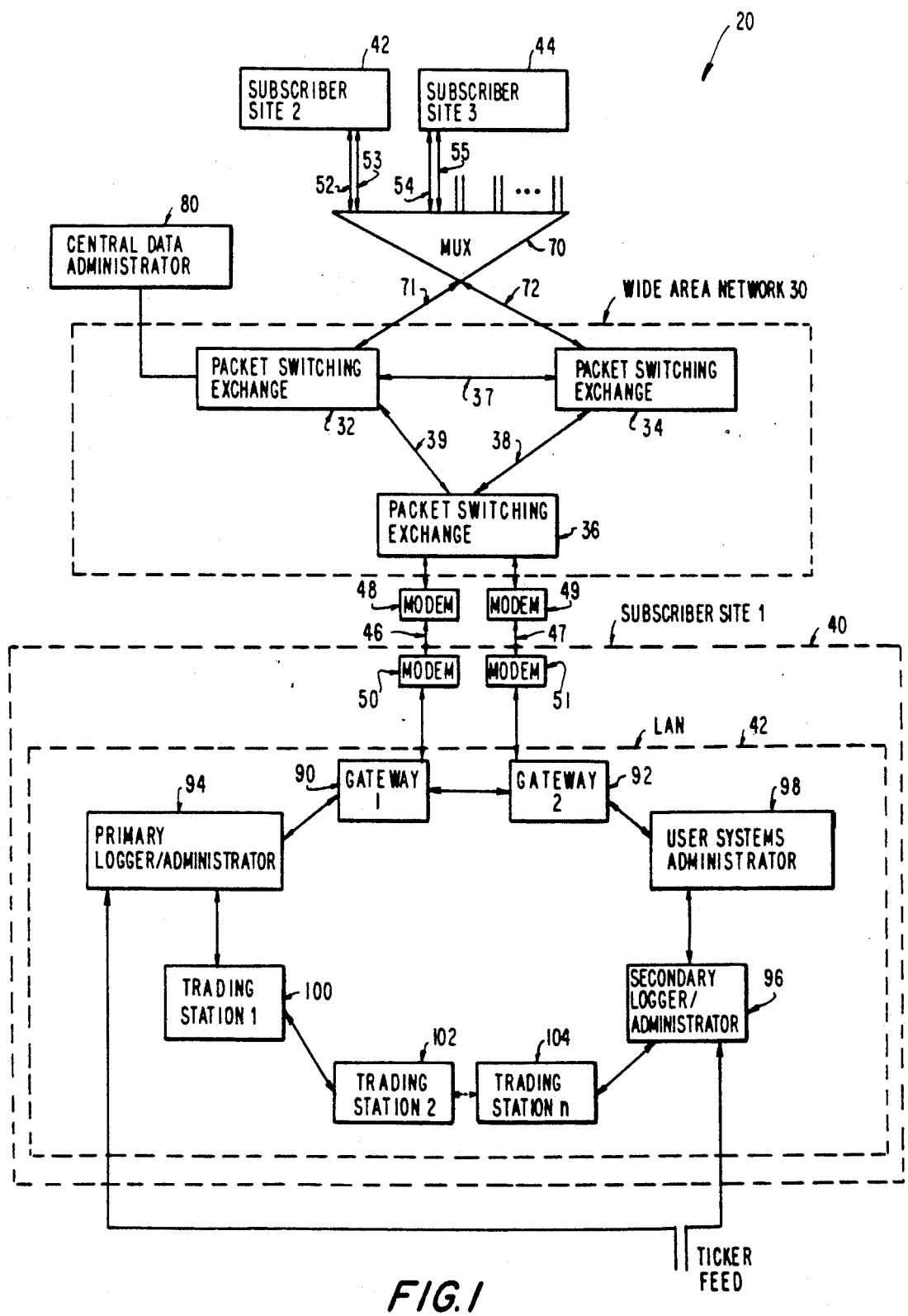
FIG. 1 is an overall system functional block diagram of a network of trading stations in accordance with the presently preferred system of the invention.
Figure 2:
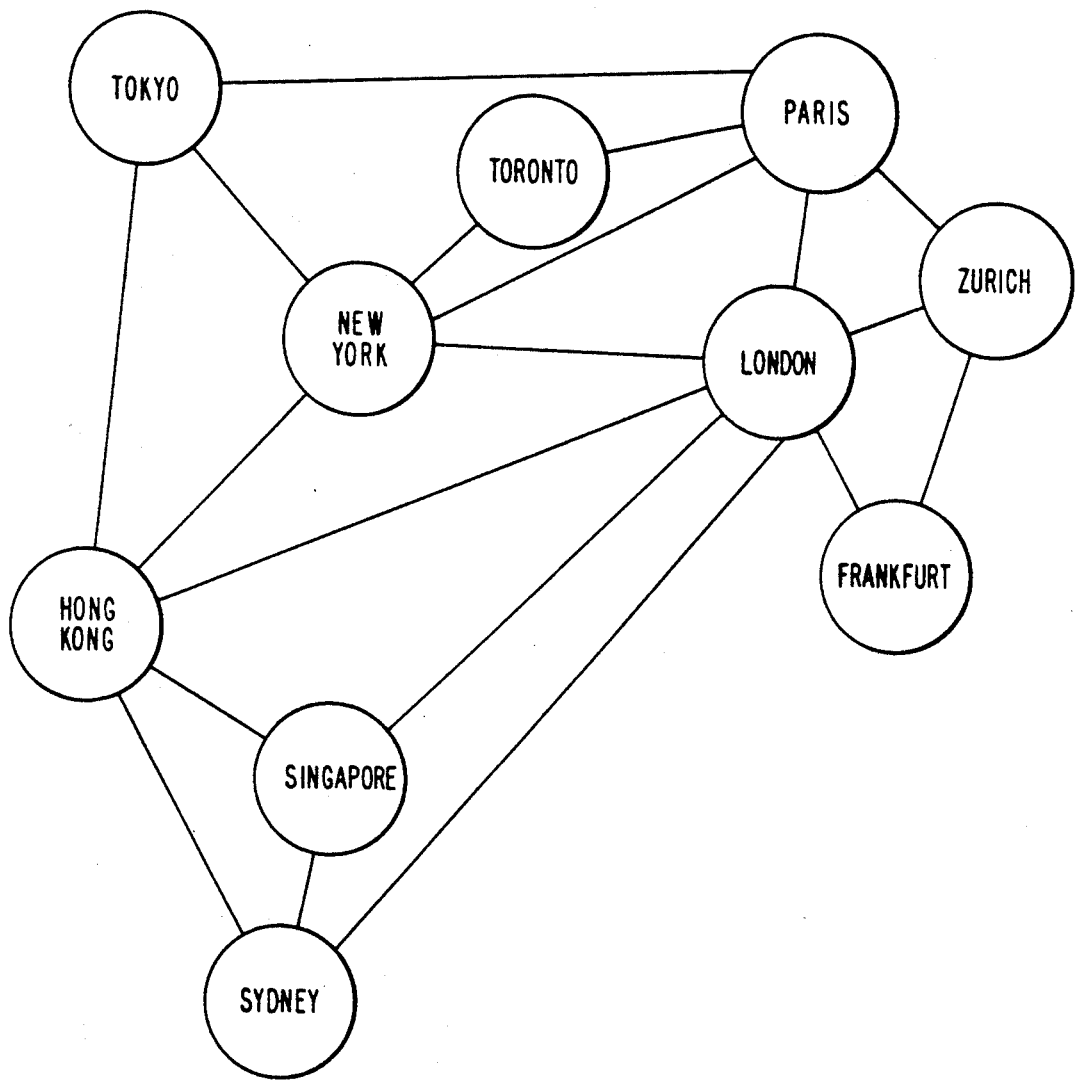
FIG. 2 is a diagram of the presently preferred packet switching network of the network of trading stations of FIG. 1.

Referring initially to FIG. 1, the system of the present invention, generally referred to by reference numeral 20, preferably utilizes a wide area network (WAN) 30 of packet switching exchanges (PSEs) 32, 34 and 36 compatible with suitable operating standards, e.g., the X.25 protocol. PSEs 32, 34 and 36 are connected to one another in a triangulated network by high speed digital trunk circuits 37-39. Each PSE comprises a number of Tymnet U-1004-01 Micro-Engines interfaced with Tymnet D-3071-01 Dual Mini XL switchers, or with Tymnet M-3071-01 Mini XL switchers. The PSEs are preferably located in major trading capitals worldwide. The PSEs are programmed, in a manner well known in the art, with the positions of a number of addresses and can route addressed packets of data accordingly from exchange to exchange to reach a PSE to which the addressee is connected. Although only three PSEs are shown in FIG. 1, the system of the present invention may employ a more complex arrangement of PSEs such as the packet switching WAN shown in FIG. 2.

Subscriber sites 40, 42 and 44 can be linked to PSEs 32, 34 and 36 over leased telephone lines 46 and 47 by 9600 bit per second modems 48-51, or subscribers can be linked via telephone lines 52-55 and modems not shown in FIG. 1 to a multiplexer 70 that is linked to PSEs via high speed digital links 71 and 72. A multiplexer 70 is preferably used where a large number of users are not located near a PSE (for example, in a country's second city.) Each subscriber is assigned a unique address.

As indicated in FIG. 1, the packet switching network also links a Central Data Administrator (CDA) 80 to the various subscribers. Like individual subscribers, the CDA also has a unique address. The CDA 80 maintains network operability and reconfigures the network to permit expansion by directing the reprogramming of the PSEs with new addresses in a manner well known in the art. The CDA also maintains system resources and maintains and updates the System Wide Data Base (SWDB). The SWDB contains information, including address information, on all the subscribers connected to the network.

Each subscriber site 40, 42 and 44 preferably includes a local area network (LAN) 42 that is linked to the packet switching WAN 30, as shown in FIG. 1. A subscriber site LAN consists of a number of components, including from two to ten gateways such as the two gateways 90 and 92 shown in FIG. 1, a primary and a secondary logger/administrator 94 and 96, one User Systems Administrator (USA) 98, and a number of trading stations 100, 102 and 104.

Figure 3:
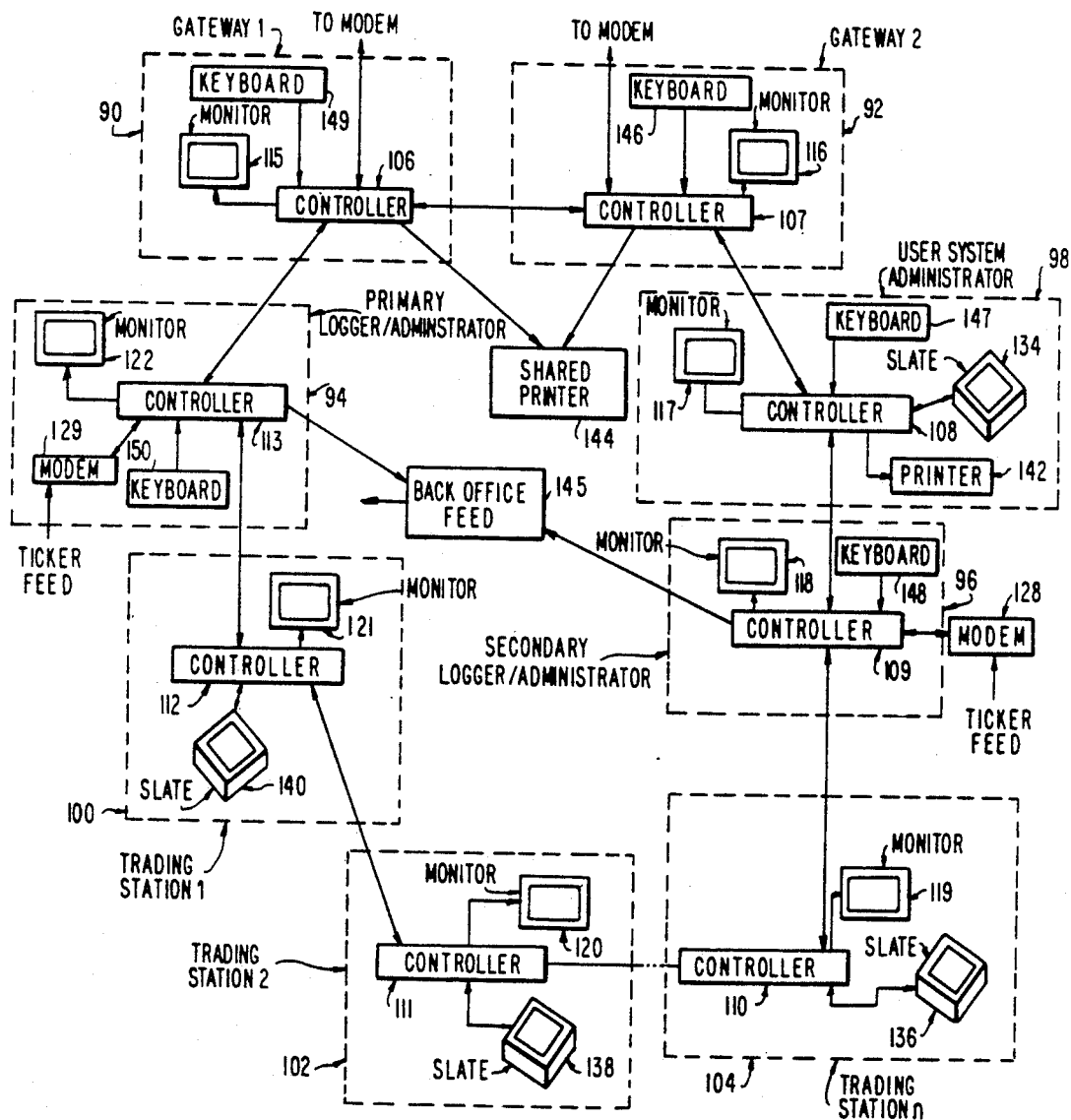
FIG. 3 is a more detailed diagram of the preferred configuration of the local area network of FIG. 1.

A more detailed view of a subscriber LAN 42 is shown in FIG. 3. Each component of the LAN preferably contains a Datamedia T4 controller 106–113 consisting of a PC-AT compatible microcomputer employing a 80286 microprocessor running at 8 MHz, 640 k bytes of extendable RAM, a 40 Mb hard disk drive, a 1.2 Mb floppy disk drive, a disk controller card, an IBM Token Ring Adaptor card and a Datamedia XEGA card to provide enhanced graphics for a color monitor. Each controller 106-113 in the LAN 42 has an associated high quality, sixteen color monitor 115-122. The components, or nodes, of the LAN 42 are preferably connected in a ring in accordance with the IBM Token Ring LAN standard to ensure error free communication between various components of the LAN. The present invention, however, is not limited to use with only the Token Ring LAN; other LAN standards such as Ethernet, Arcnet or others could also be used. Similarly, microcomputers other than the one mentioned above could be used as LAN nodes. Each node of the LAN has a unique address. The various nodes of the LAN 42, the hardware differences of the nodes from the above standard configuration, and the respective functions of the different nodes are described below.

The gateways 90 and 92 preferably consist of a controller 106 and 107 with a Hardware Forge HWFPCI X.25 adaptor card, two serial/parallel port adaptor cards and a color monitor 115 and 116 and keyboard 146 and 149. These cards are in addition to those indicated in the standard configuration. Each gateway 90 and 92 is connected via modem 50 and 51 to a PSE (or a multiplexer connected to a PSE.) The gateways 90 and 92 serve as the interface between the IBM Token Ring LAN 42 and the X.25 WAN 30. The gateways also share a back office feed 145, through which information regarding completed transactions can be transmitted to other computers for further analysis. The gateway hard disks contain a Deal Type Profile and a Queue Profile that associate currency pair and deal types with primary and secondary queue addresses. These profiles are uploaded into the gateway controller's memory when the systems is in operation. Each LAN 42 has at least two gateways 90 and 92 to provide resilience and increase call handling capability. A LAN may have up to ten gateways, although only two are shown in FIGS. 1 and 3. Each gateway can handle up to four communication lines with each line capable of handling up to sixty-four virtual circuits. As more trading stations are added to the LAN, additional gateways can be added to handle the increased traffic between the WAN and the trading stations. Each of the gateways 90 and 92 broadcasts an "alive" signal to the logger/administrators 94 and 96 to indicate the extent of its present CPU usage. The gateway monitors 115 and 116 indicate the present status of the LAN side of the network, the X25 (WAN) side of the network and the buffers in between which the gateways create.

The logger/administrators 94 and 96 each preferably consist of a T4 controller 109 and 113 with a color monitor 118 and 122, keyboard 148 and 150 and, in addition to the standard cards noted above, a serial/parallel port adaptor card and an Intel Above Board memory card. Connections via 4800 bit per second modems 128 and 129 connect both logger/ administrators (L/As) through a serial port to a ticker feed such as the TELERATE ticker feed which supplies current commodity prices. Each L/A also shares a printer 144. The L/A computers also maintain a clock for the network, which the trading stations periodically check. The secondary L/A 96 is provided as a back up for the primary L/A 94 to provide resilience. When the LAN 42 is initialized at start up both L/As attempt to go on line as the primary L/A. Each L/A must check to see if another L/A is already on the system and will default to the secondary L/A if a primary already exists. If the primary L/A fails, the secondary will take over and become the new primary. When the failed primary comes back on line, its transaction records and view of the system status will be updated by the active L/A. The primary L/A 94 determines outgoing call routing via the appropriate gateway to the WAN. Both L/As 94 and 96 log all transmissions that are received through the gateways 90 and 92 and all transmissions being sent to the gateways for transmission over the WAN, except quote requests and decline to quote messages, as previously noted. Logged messages include all bids and offers and all proposals and acceptances. When a trading station 100, 102 or 104 requests an outgoing call, both L/As 94 and 96 log the call and send an acknowledgement back to the trading station. The acknowledgement indicates to the trading station the gateway that is to be used to transmit the call out to the WAN. The primary L/A 94 also broadcasts data from the ticker feed it receives to all trading stations 100, 102 and 104 on the LAN. Additionally, the primary L/A 94 broadcasts a regular 12 second poll to each trading station; if a trading station does not receive a poll, it assumes that the L/A is dead and logs its own completed calls. The L/A monitors 118 and 122 display a LAN activity report, ticker feed information and information regarding priority, status and the LAN address of the L/A.

The L/A acts as a file server for the whole LAN. The System Wide Data Base (SWDB) and the local extract from it describing this institution (including various profiles) are physically maintained on the hard disks of the primary and secondary L/As. Standard industry caching techniques are used to maintain most-frequently-used and currently-in-use portions of the SWDB and local extract at the USA and at each trading station.

The User System Administrator (USA) 98 preferably comprises a T4 controller 108, a color monitor 117, an input slate 134, keyboard 147 and a printer 142. The USA controller 108 is configured with a second XEGA card for slate graphics, a Datamedia DM 070AAB07 slate adaptor card for the slate inputs, an Intel Above Board memory card, a serial/parallel port card, and Tecmar Adaptor card QT 813281. The USA maintains the local image of the System Wide Data Base (SWDB) by a set of transactions with the SWDB on the L/A hard disk. A new subscriber uploads an image of the SWDB to its USA using some form of transferable media, such as floppy disks; the USA then "builds" by extraction the local data base. Updates to the SWDB image can be requested by the USA over the packet switching WAN from the CDA 80, which then downloads the changes over the WAN. The SWDB contains names and system addresses for all subscribers currently on the system. The operator of the USA enters and updates profiles via the input slate 134 or keyboard 147 for the institution, for each commodity being traded by the subscriber, for each trader, and for the counterparties. The SWDB is structured by data and file type. The Institution Profile contains selections for the date format, close of business time, time zone information, messages to be sent when declining a quote and trader support and back office system identification codes.

The invention will be described primarily in connection with currency transactions, although it is applicable generally to other commodities. Consequently, the commodity profiles will be referred to as Currency Profiles. Currency Profiles contain the usual account and settlement instructions for each currency, a currency code, possible currency pairs, and default dealt amounts and ranges for each currency pair.

Trader Profiles contain the full name and display name for each trader, and ID and security codes for each trader and a default currency pair. The Trader Profiles also contain, for each trader, a list of currency pairs which the trader trades in, default dealt amounts and range limits for each currency pair, an indication of whether a dealt amount is to be sent with quote requests for each currency pair and, if an amount is to be sent, whether that amount is a maximum or exact amount, transaction types allowed for each currency pair, a list of up to a selected number of counterparties for each currency pair and a queue length. By way of example, a list of eighty-nine counterparties has been found effective. The Trader Profiles also indicate whether the trader can both make and receive calls on the system, or whether he can only receive calls or only make outgoing calls. Finally, the Trader Profile indicates whether each trader's incoming calls queue has primary or secondary status for incoming calls.

Counterparty Profiles contain a list of selected counterparties. For each counterparty listed, the currency pairs for which transactions are permitted with that counterparty are also listed, as well as standing instructions for each currency and usual transaction amounts for each currency. The Counterparty Profile also contains data indicating the time zone of the counterparty.

The input slates 134, 136, 138 and 140 used by the USA 98 and by the trading stations 100, 102 and 104 are preferably programmable backlit LCD screens overlaid with a touch-sensitive film. The slates are manufactured by Datamedia. The programmable LCD screen displays a changing array of fields, each of which can be activated by the operator by touching the screen within the desired field. The respective main controller programs for the USA and for the trading stations control the slate displays by displaying one of a number of stored slate forms. The particular slate form displayed at any one time on a slate is dictated by both previous input from the slate itself and signals received from other trading stations through the LAN.

Each of the trading stations 100, 102 and 104 comprises a T4 controller 110, 111 and 112, a color monitor 119, 120 and 121, and an input slate 136, 138 and 140. The trading station controllers 110, 111 and 112 are configured with a second XEGA card for the graphics slate, an Intel Above Board memory card and a Datamedia Slate Adaptor Card. The trading station controller hard disk contains a copy of the Spot Trading Program. All trading on the system takes place at a trading station.

System Message Format

Figure 4:
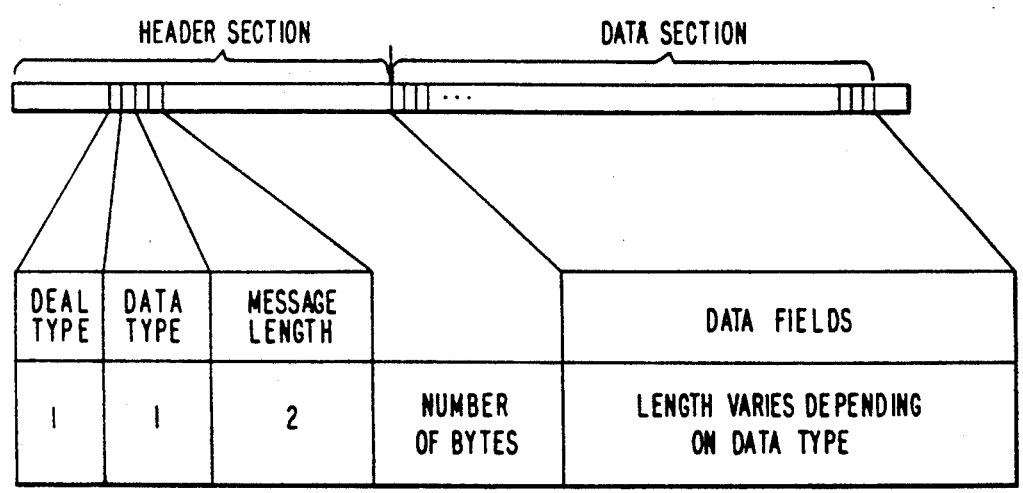
FIG. 4 is a diagrammatic illustration of a typical data message used in the preferred system of the present invention.

The preferred format of the data messages transmitted by the system of the present invention will now be described in detail. As indicated in FIG. 4 all data messages of the system comprise a header section and a data section. The header section includes Deal Type, Data Type (or Data Message Type) and Message Length fields as well as other fields that are required for transmission over the LAN and WAN. These other fields, as is well known in the art, include at least one field indicating the addressee of the message. The one byte Deal Type field contains a spot code for all data messages relating to spot transactions. The one byte Data Type field can have any one of the twelve values indicated in the following table:

TABLE A

| Types of Data Message Records | |
|---|---|
| Number | Name |
| 1 | Quote Request |
| 2 | Quote |
| 3 | Proposal |
| 4 | Acceptance |
| 5 | Change |
| 6 | Decline To Quote |
| 7 | Nothing To Propose |
| 8 | Quote Negotiation |
| 9 | Decline To Negotiate |
| 10 | Acceptance Plus More Proposal |
| 11 | Decline More Proposal |
| 12 | Cancel |

The two byte Message Length Field indicates the length of the entire message in bytes.

The format and length of the data section of a transmitted message varies depending upon the contents of the Data Type field of the header section. The various message types shown in Table A correspond to the various stages that occur in a transaction in the system of the present invention. The Data Type indicator indicates the significance of all data in the data section field by indicating the structure of the data section fields. The structures of the data section fields for the possible message types are listed in Table B.

TABLE B

| Message Data Fields | |
|---|---|
| Number of Bytes | Field Name |
| | Data Type = QUOTE REQUEST |
| | Deal Information: |
| 3 | Requesting Institution's Value Date |
| 2 | Currency Pair ID (Dealt/Settled) |
| 3 | Rate Dealt Currency ID |
| 3 | Rate Settled Currency ID |
| 8 | Amount |
| 2 | Amount Currency ID |
| | Requesting Institution Information: |
| 12 | Trader Institution Name |
| 3 | Trader Institution Location |
| 8 | Trader Name |
| | Data Type = QUOTE |
| | Deal Information: |
| 3 | Quoting Institution's Value Date |
| 8 | Bid |
| 8 | Offer |
| 8 | Amount |
| 2 | Amount Currency ID |
| 2 | Currency Pair ID (Dealt/Settled) |
| 2 | Portfolio ID |
| 1 | Decline to Negotiate Flag |
| | Counterparty Institution Information: |
| 8 | Trader Name |
| | Data Type = PROPOSAL |
| | Deal Information: |
| 1 | Buy/Sell Indicator Flag (Buy, Sell, Neither) |
| 8 | Amount |
| 2 | Amount Currency ID |
| | Settlement Instruction Info. — Dealt Currency: |
| 1 | Instruction Type Indicator (Standing or Usual) |
| 6 | Agent ID |
| 12 | Agent Name |
| 3 | Agent Location |
| 10 | Account ID Number |
| | Settlement Instruction Info. — Settled Currency: |
| 1 | Instruction Type Indicator (Standing or Usual) |
| 6 | Agent ID |
| 12 | Agent Name |
| 3 | Agent Location |
| 10 | Account ID Number |
| 1 | Check Big Figure Flag |
| 1 | Type of Negotiation Flag |

TABLE B-continued

Message Data Fields

| Number of Bytes | Field Name |
|---|---|
| | (No Negotiation, Close Spread, Improve Bid, Improve Offer, Negotiation Declined) |
| 8 | Bid |
| 8 | Offer |
| | Data Type = ACCEPTANCE |
| | Deal Information: |
| | Settlement Instruction Info. — Dealt Currency: |
| 1 | Instruction Type Indicator (Standing or Usual) |
| 6 | Agent ID |
| 12 | Agent Name |
| 3 | Agent Location |
| 10 | Account ID Number |
| | Settlement Instruction Info. — Settled Currency: |
| 1 | Instruction Type Indicator (Standing or Usual) |
| 6 | Agent ID |
| 12 | Agent Name |
| 3 | Agent Location |
| 10 | Account ID Number |
| 1 | End of Deal Action Indicator (Bye, Quote Me or Anything Else) |
| 8 | Dealt Amount |
| 8 | Bid |
| 8 | Offer |
| 2 | Amount Currency ID |
| 1 | Buy/Sell Flag (Buy, Sell, Neither) |
| | Data Type = CHANGE |
| | Deal Information: |
| 2 | Buffer Pad |
| | Data Type = DECLINE TO QUOTE |
| | Deal Information: |
| 25 | Decline Reason |
| | Counterparty Institution Information: |
| 2 | Trader ID |
| 8 | Trader Name |
| | Data Type = NOTHING TO PROPOSE |
| | Deal Information: |
| 1 | End of Deal Action Indicator (Bye, Another Request, Allow Request) |
| | Data Type = QUOTE NEGOTIATION |
| | Deal Information: |
| 1 | Type of Negotiation Flag (No Negotiation, Close Spread, Improve Bid, Improve Offer, Negotiation Declined) |
| 8 | Amount |
| 1 | Amount Currency ID |
| | Data Type = DECLINE TO NEGOTIATE |
| | Deal Information: |
| 2 | Buffer Pad |
| | Data Type = ACCEPTANCE PLUS MORE PROPOSAL |
| | Deal Information: |
| 8 | One Way Price |
| 8 | Amount |
| 2 | Amount Currency ID |
| | Settlement Instruction Info. — Dealt Currency: |
| 1 | Instruction Type Indicator (Standing or Usual) |
| 6 | Agent ID |
| 12 | Agent Name |
| 3 | Agent Location |
| 10 | Account ID Number |
| | Settlement Instruction Info. — Settled Currency: |
| 1 | Instruction Type Indicator (Standing or Usual) |
| 6 | Agent ID |
| 12 | Agent Name |
| 3 | Agent Location |
| 10 | Account ID Number |
| 8 | Dealt Amount |
| 8 | Bid |
| 8 | Offer |
| | Data Type = DECLINE MORE PROPOSAL |
| | Deal Information: |
| 1 | End of Deal Action Indicator (Bye, Another Request, Allow Request) |
| | Data Type = CANCEL |
| | Deal Information: |
| 2 | Buffer Pad |

For example the data fields in a quote request message in the present system would consist of 44 bytes of data. The Deal Type field of the header section indicates that the transmission is for a spot transaction; the Data Type Field is set to the binary value of 1 (00000001) to indicate that this is a quote request as indicated in Table A.

The contents and position of the data fields of the message are indicated in Table B under the "Data Type=Quote Request" heading. The first three bytes of the data portion of the message contain the Requesting Institution Value Data followed by two bytes containing a Currency Pair ID Code. The bytes of the remaining fields are filled with the information as indicated in Table B, with the final eight bytes indicating the Trader Name. When a trading station is preparing to transmit a message, it creates the message in the format described in FIG. 4, Table A and Table B using the present status of the transaction as reflected by the current slate display and the slate input to determine the Data Type of the message to be transmitted. Once the Data Type is determined, the message is created in the above described formats using the data in the slate fields, the locally stored profiles and the appropriate data buffers and memories to fill the indicated fields. The Deal Type, Data Type and Message Length fields are positioned in the message in a location where they can be readily found. This can be accomplished by always putting them the same distance (in bytes) from the start of the data message, by putting them adjacent to an indicator of some sort, or by any other conventional programming technique used in the art to achieve this purpose. The beginning of the data portion of the message is similarly positioned so that it may be readily located.

Upon receiving a transmitted message, the receiving trading station decodes the message by accessing the Deal Type, Data Type and Message Length fields of the header section to determine the deal and data types. The data in the data section may then be decoded as indicated in Table B. Additionally, each trading station stores each transmitted and received message locally until a transaction is completed and the transaction is logged, or until the communication link is terminated.

System Operation

The execution of a spot trade on the system of the present invention will now be described in detail. It is assumed that the gateways, logger/ administrators, USA, LAN and WAN are functioning as described above. When a trading station included in an active LAN is turned on at a subscriber site, a program is automatically initiated by the trading station controller to run diagnostic tests on the controller and its associated devices. After these tests are complete, a log on program is automatically loaded from the trading station hard disk into RAM and executed. This program prompts the trader to sign onto the subscriber LAN by entering his TRADER ID CODE using the slate. The trader is then prompted to enter his security code. The codes are then transmitted over the LAN to the L/A. If the entered codes match any of the trader and security codes stored in the Trader Profile files, a copy of the trader's Trader Profile corresponding to the trader identification code is downloaded to the trading station. The Counterparty Profiles are also down-loaded to the trading station. The trading station sends the gateways the TRADER ID CODE from the Trader Profile and the trading station's LAN address. Each gateway stores a list of TRADER ID CODEs and their present LAN address which indicates which traders are logged onto the LAN and what their LAN address is. A copy of the Spot Trading Program (STP) that is stored on the trading station hard disk is then executed at the trading station.

Figure 5:
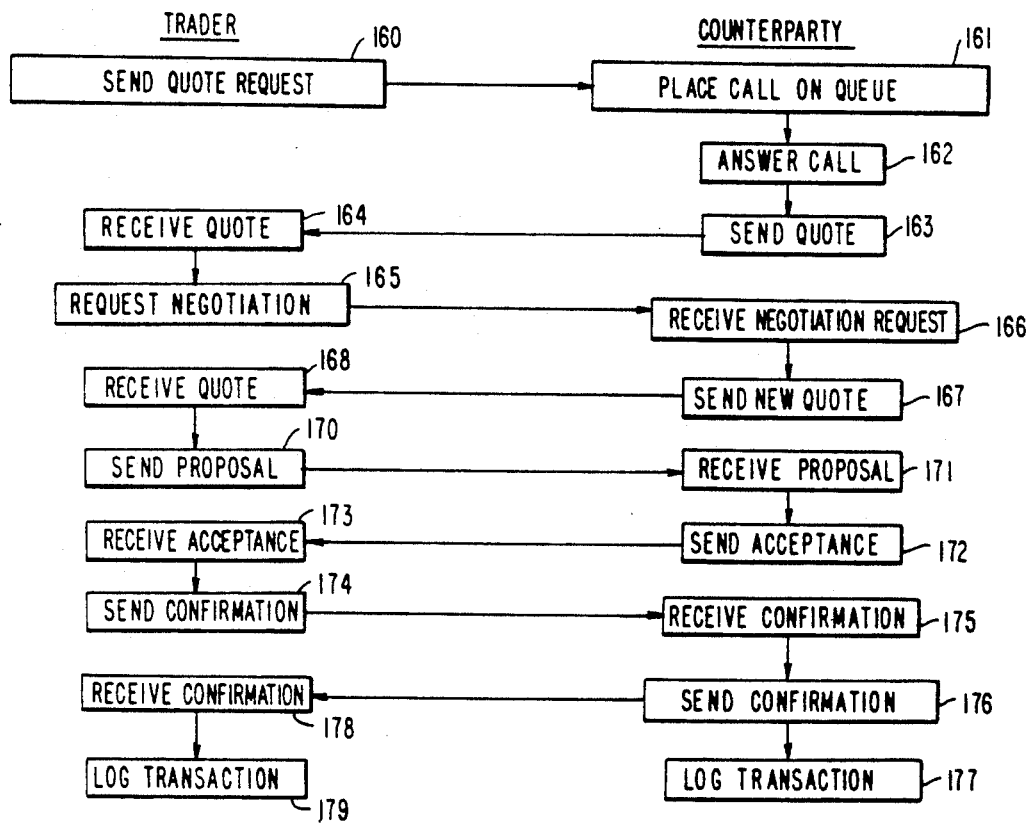
FIG. 5 is a basic logic flow diagram of trading in accordance with the system of the present invention, illustrating a typical transaction at both the trader and counterparty trading stations.

A typical spot transaction on the system of the present invention is accomplished as indicated in the main logic flow diagram shown in FIG. 5 under the control of the STPs at the two trading stations. The STP directs the progress of the trade from one stage to the next by controlling the slate displays and responding to the trader input from the slate and incoming responses to determine the next appropriate slate display.

Figure 7A:
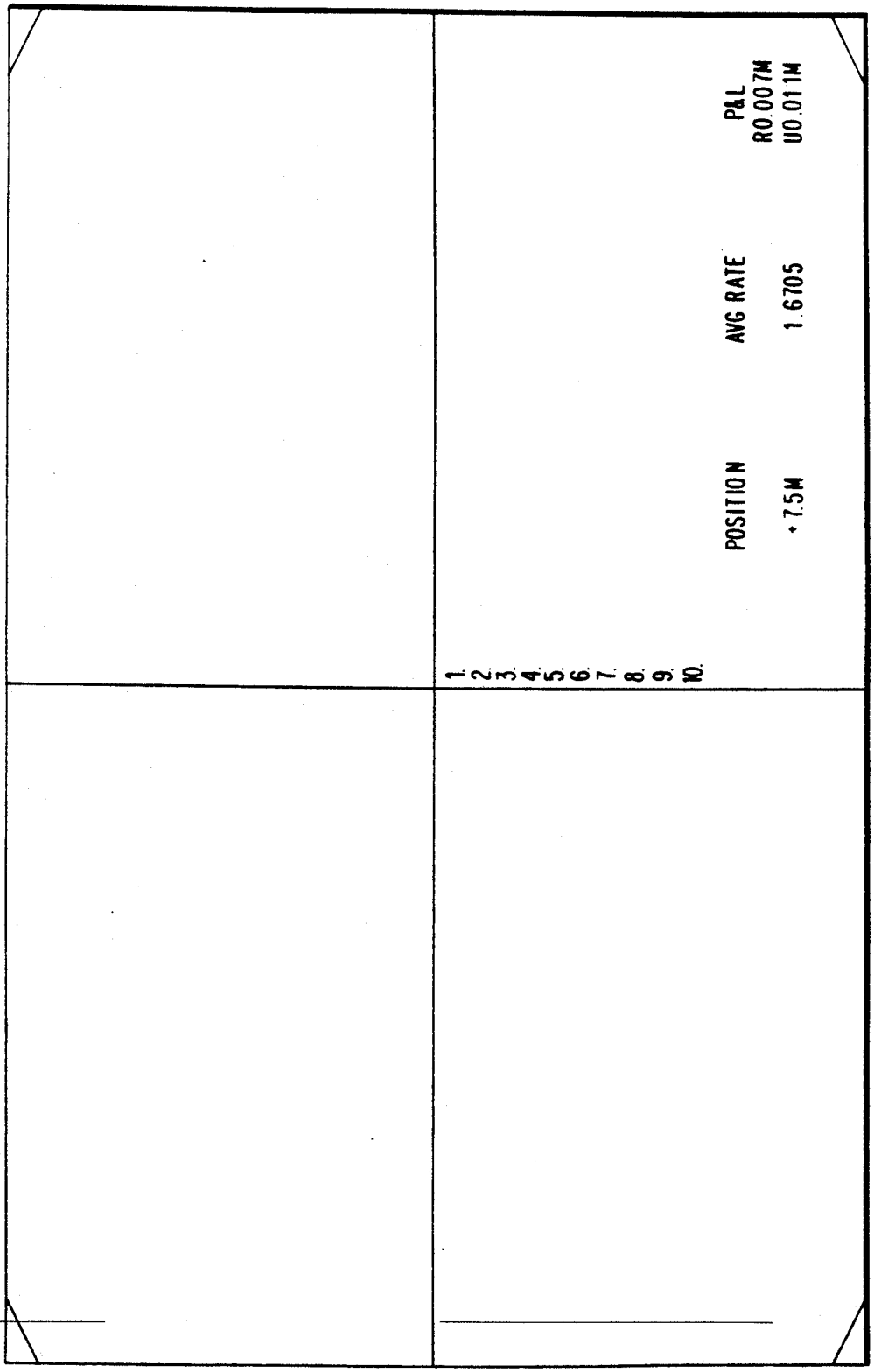
FIGS. 7A and 7B are diagrammatic illustrations of typical monitor and slate displays in the SELECT COUNTERPARTY state.

The STP directs the trading station controller to divide the monitor into four quadrants as shown in FIG. 7A. Each of the displayed quadrants can be utilized to transact a separate trade. The slate permits the operator to enter and transmit responses regarding the transaction displayed in the currently active quadrant. A red band across the bottom of a quadrant indicates that it is the active quadrant. The slate also permits the operator to change the active quadrant, or to suspend trading and alter the Trader's Profile or review completed transactions. A queue of incoming calls is displayed in an empty quadrant, usually in the lower right quadrant as shown in FIG. 7A. If all four quadrants are being used for trades, the slate can be used to call the queue up to the monitor as will be described in detail below.

The colors of the foreground and background of each quadrant of the monitor vary depending upon the status of the transaction displayed in that quadrant within the structured framework of the invention. A black or white background indicates that no action is necessary in that quadrant. A brightly colored background indicates that the other party to the transaction is waiting for a response from the party viewing the screen. This information is useful because, as will be explained in detail below, a party that has just transmitted a response in a transaction must generally wait until the other party responds before he again transmits a response. Consequently, this use of colors permits the operator of a trading station to determine with a glance the state of all pending transactions and whether any parties are awaiting a response from the operator.

At the start of a spot transaction, if the trader has just logged on to the trading station, the monitor will, in the preferred embodiment of the present invention, appear as shown in FIG. 7A, with the incoming calls queue in the lower right quadrant empty as shown. The queue shown permits up to ten calls to be displayed. The queue also displays the net open position of the trader in the currently selected currency, the average rate of the transactions and the realized and unrealized profit and loss, with "M" denoting millions and "B" denoting billions.

Figure 7B:
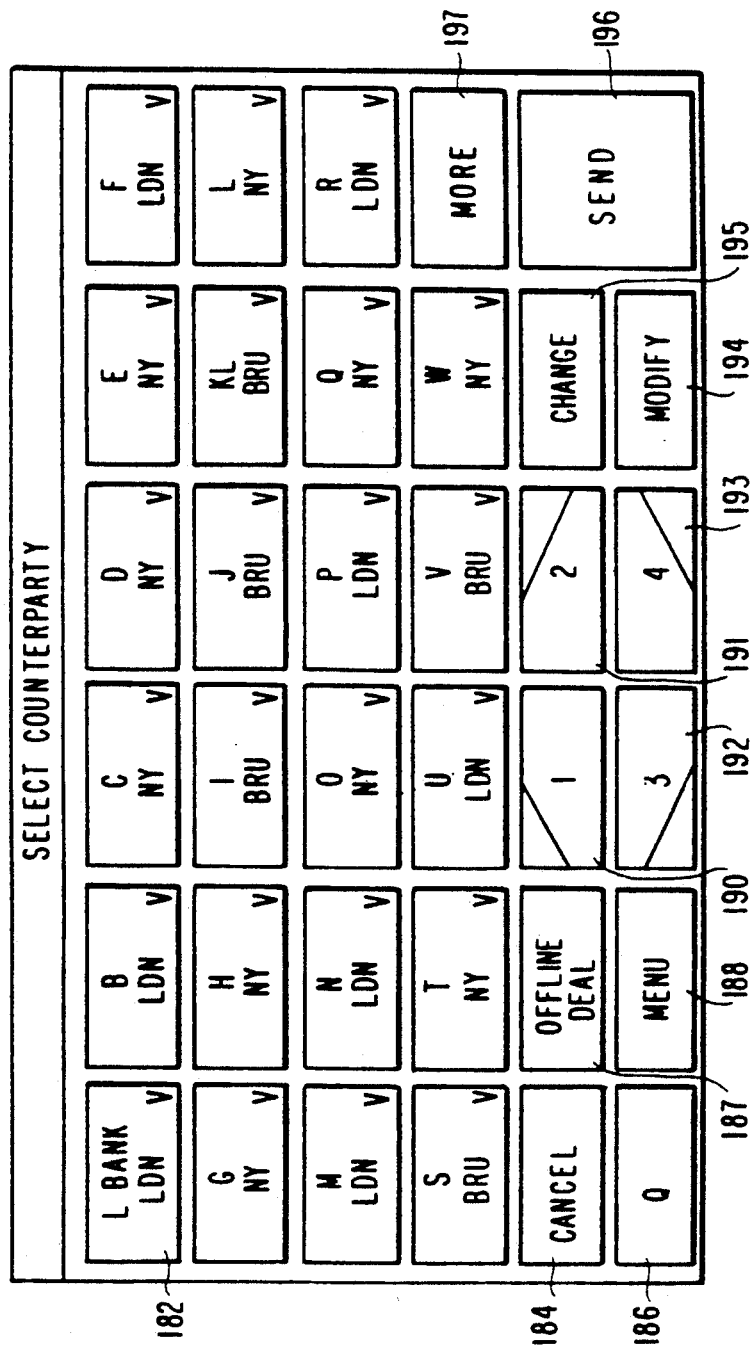

The STP accesses the Trader Profile to determine the default currency pair. The STP then accesses the counterparty list corresponding to the default currency pair from the Trader Profile. Using the counterparty list and a stored slate template, the STP directs the slate to appear in the SELECT COUNTERPARTY state as shown in FIG. 7B. By touching MENU 188 the trader can move to a MAIN MENU display where he can modify the Trader and Counterparty Profiles using conventional file editing techniques. The Trader and Counterparty Profiles, as well as all the other profiles can also be edited in a similar manner by the USA computer. The trader may return to the SELECT COUNTERPARTY display when he has finished editing the profiles. By touching OFFLINE DEAL 187, the trader may enter the details of a transaction that was not performed on the system so that the market position of the subscriber as tracked by the system may be kept current.

A trade initiated by the trader Joe at ABC Bank in New York will now be described. The trader may wish to trade in a currency pair other than the default currency pair which is indicated in the Trader's Profile. To select a currency pair other than the default, the trader touches the MODIFY 194 field on the slate. This will cause a MODIFY CURRENT DEFAULTS slate display to appear offering a choice of currency pairs to choose from. The currency pairs available correspond to those in the trader's Trader Profile. The trader then selects the desired currency pair, enters the pair and the STP automatically returns to the SELECT COUNTERPARTY display as shown in FIG. 7B, with the counterparty display now created by the STP from the counterparty list in the Trader Profile corresponding to the newly chosen currency pair. For the present example, "Pound Sterling/U.S. Dollar" is the currently selected currency pair at the trading station of trader Joe of ABC Bank.

Figure 6A:
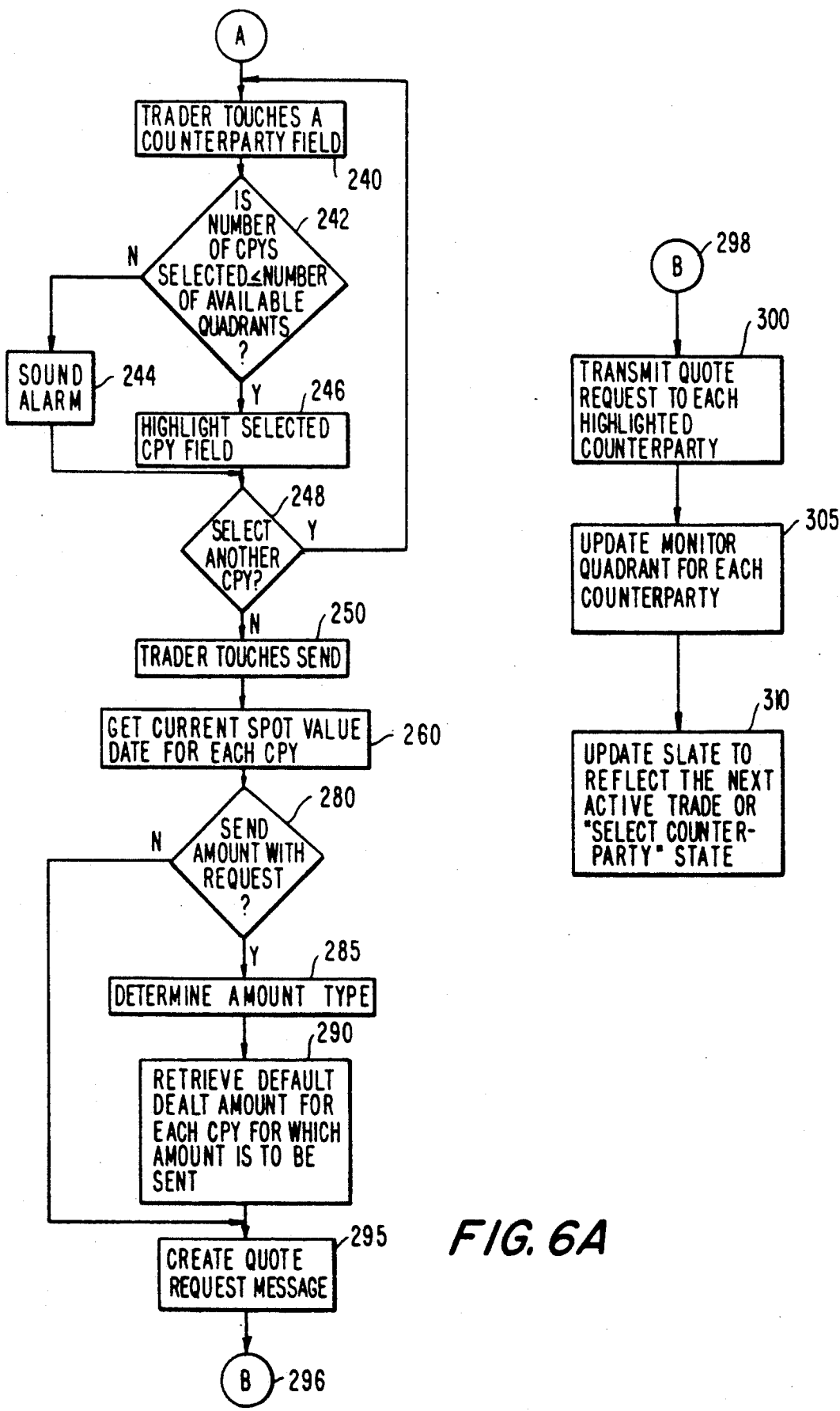

As noted in FIG. 5, the first stage of a spot transaction involves the transmission of a quote request from the trader to the counterparty as represented by block 160. A more detailed flow diagram of this stage is shown in FIG. 6A. In the SELECT COUNTERPARTY state shown in FIG. 7B, the slate displays up to 23 different potential counterparties that the trader can initiate communications with to perform a spot transaction in that currency pair. More counterparties can be accessed by touching the MORE field 197 displayed on the slate. The system of the present invention permits the trader to select from among 89 potential counterparties displayed on up to four different slate displays per currency pair; the first counterparty slate display shows 23 counterparties, whereas the remaining displays also include a SCROLL BACK field (not shown in the figure) and thus show only 22 counterparties. Using MORE 197 or SCROLL BACK, the trader can move from one counterparty display to the next or previous display. The screen displays are generated from the list of counterparties stored in the Trader Profile; this list is created by the trader or the USA by selecting counterparties from the Counterparty Profile. By touching MORE 197 when the fourth counterparty display is on the slate, the trader may enter the name of a country or the initial letter of counterparty name and direct the system to display all counterparties from the Counterparty Profile either in that country or with that first initial. Similarly the trader may elect to display a particular counterparty by typing in the name of a counterparty using a keyboard displayed on the slate.

When the desired counterparty display has been selected, the trader may select up to four of the displayed counterparties by touching the field on the slate corresponding to the particular counterparty. This function is represented by block 240 of FIG. 6A. As each field is touched, it is usually highlighted on the slate as indicated by the block given reference numeral 246. A slate field is highlighted by applying the reverse video signal to the slate within the are of that field. A trader may select as many counterparties to send quote requests to as there are open screen quadrants at the time. In the situation shown in FIG. 7A, up to four quote requests could be sent. Because the incoming calls queue can be hidden behind an active trade, all four quadrants are still available in FIG. 7A. As indicated by decision block 242, any attempt to select more counterparties than the number of available quadrants will result in an audible alarm at the trading station to indicate the error as represented by block 244; the erroneously selected counterparty fields are not highlighted, and will not be sent if SEND 196 is touched. For the present description, it will be assumed that only one counterparty field, the one corresponding to L Bank in London 182 is touched by the trader at ABC Bank, although there is no difference in the manner in which an individual trade takes place regardless of how many trades a particular trading station or trader is engaged in at a given moment. When multiple trades are being conducted in the various monitor quadrants, a trader moves from one trade to another automatically, according to the chronology of the responses coming in or by selectively changing the active quadrant using one of the four quadrant fields 190, 191, 192 or 193 shown at the bottom center of FIG. 7B. One of the four quadrant fields is always highlighted to indicate the active quadrant. A red background in the status line at the bottom of a monitor quadrant also indicates the active quadrant.

After selecting the counterparty field displaying L Bank London 182 to highlight it, the trader then touches the SEND area 196 of the slate to direct the system to send his request for a quote on the pound/dollar spot prices to the selected counterparty, L Bank London. In the present example, the transmission of a single quote request will be described according to FIG. 6A; if more than one counterparty had been chosen and highlighted before SEND 196 was touched, at the relevant steps the activity described would be performed for each selected counterparty before proceeding to the next step.

When the trader touches SEND 196 as illustrated by block 250 of FIG. 6A, the STP at the trading station determines a value date for the transaction using the accepted practice in the trade for calculating the value date from the deal date as represented by block 260. Each trading station in the system of the present invention maintains a clock and the STP can determine the counterparty's date as compared to the trader's date using the clock and the time zone information in the Counterparty and Institution Profiles. If both the trader and the counterparty in their respective cities currently have the same date, the value date is computed using today's date at the trader location as the deal date and no further input from the trader is necessary. If the trader and counterparty today's dates differ, or if the present time at the trader location is past the subscriber selected close of business day stored in the Institution Profile, the system presents the trader with a slate display allowing him to choose from one of two value dates based on the two possible deal dates or by touching "OTHER" he can select an alternate value date from a calendar. When one of these dates has been selected by touching it on the slate display, the system will transmit the quote request.

Usually, in the preferred manner of using the present invention, a dealt amount is not sent with a quote request. If, however, the Trader Profile indicates that a maximum or an exact dealt amount is to be sent with the selected quote request, the STP directs the trading station to check the Counterparty, Trader and Currency Profiles in that order to determine the correct default amount. The Trader Profile indicates whether the amount to be sent is a maximum or an exact amount. This process is represented by blocks 280 through 290 of FIG. 6A. As soon as a default amount is found in one of the Profiles, the amount and amount type are used by the STP in creating the data message to be transmitted. The STP uses the selected currency pair, the selected counterparty and the trader's TRADER ID as illustrated by block 295 to create the quote request message as indicated in Tables A and B and FIG. 4. The trading station then transmits the quote request as indicated by block 300 and as will be discussed in detail below.

At this time, the STP uses the information used in the transmission of the quote request to create, in an available monitor quadrant, the display as shown in FIG. 8. This step is represented by block 305 of FIG. 6A. The counterparty, today's date, the value date, the currency pair are displayed as shown in FIG. 8. The prompt line located below the counterparty name reads THEY WILL QUOTE and the status line at the bottom of the monitor quadrant displays OUR REQUEST FOR QUOTE. FIG. 8 shows a trader's monitor quadrant where no dealt amount was sent with the quote request. If a maximum dealt amount of 5 million STG had been sent with the quote request, the prompt would read THEY WILL QUOTE ON UP TO STG 5,000,000. (If an exact amount had been sent, the prompt would read THEY WILL QUOTE ON EXACT AMOUNT STG 5,000,000.) The monitor quadrant displays a dark blue foreground, including the characters, on a white background to indicate the outgoing quote request status and the lack of background color indicating that the trader is awaiting a response. The trader slate display returns to the SELECT COUNTERPARTY state or reflects another active trade in progress as indicated by block 310 of FIG. 6A. As will be shown below, after sending all transmissions except CHANGE, the trading station slate display returns to the SELECT COUNTERPARTY state or reflects another active trade in progress.

Referring back to the transmission of the quote request as indicated in block 300, this process will now be described. A signal indicating that the particular trading station is transmitting a quote request is then passed along the LAN 42 at the trader's site to logger/administrator computers 94 and 96. The primary L/A 94 transmits a gateway usage signal to the trading station to indicate the gateway to be used to transmit the quote request. The primary L/A also designates and transmits a Session ID Number for the quote request, which the trading station adds to the header portion of the message to be transmitted. The trading station then sends the quote request to the designated gateway based upon the gateway usage signal sent by the primary logger/administrator 94. At the designated gateway 92 the quote request and its intended address are converted to an X.25 protocol data packet for transmission by modem 50 to the PSE modem 49 and then to the packet switching exchange 36. After the data packet is received by the PSE 36, it is then routed along the packet switching WAN 30 to a packet switching exchange associated with the selected counterparty. This initial transmission sets up a virtual circuit within the packet switching network over which all further communications between the two parties will pass if the quote request is answered by the counterparty. The data packet is then sent by modem from the packet switching exchange associated with L Band in London to the L Band London's LAN through the LAN's gateway computer at L Bank London's trading site. In the discussion that follows, the LAN 42 shown in FIGS. 1 and 3 will be used to explain the function of the system at both ABC Bank in New York and L Bank London.

The gateway controller 106 of the gateway 90 that receives the quote request at L Bank London stores the message in an incoming message buffer. The controller 106 then decodes the Data Type field to determine that the transmission is a quote request. The controller then decodes the Rate Dealt and Rate Settled Currency IDs found in their respective fields and the Deal Type field of the quote request to determine the current pair and deal type for which the quote request was sent. The gateway controller 106 accesses the Deal Type Profile to determine a Queue ID for the currency pair and deal type. The controller then accesses the Queue Profile for this Queue ID and determines which primary traders' queues the call is routed to. The controller then uses its current list of TRADER ID CODE LAN addresses to determine the primary trading stations to send the quote request to. All primary trading stations with an open slot in their incoming calls queues can accept the call by placing it in the queue and sending an acknowledgement signal back to the gateway 90. If the gateway does not receive an acknowledgement signal, the system, the call is routed to secondary trading stations in the same manner, with the STP accessing the Queue Profile to determine the secondary trading stations. If the secondary queues are also full or not logged on, the system sends a BUSY message back to the trading station from which the quote request came. If the system is able to place the call on one or more queues, those queues at the trading stations accepting the call will indicate that trader Joe from ABC Bank is requesting a dollar/pound spot quote. The queues of all of the traders at L Bank London that were sent the call by the gateway will be updated with this information. The STP at the trading station uses the relevant data from the message in its incoming calls queue to create the display of the contents of the queue in an open monitor quadrant as shown in FIG. 9. This process is represented by the Place Call on Queue block 161 of the Main Diagram shown in FIG. 5.

If the call is placed in a queue, the associated trading station sends an acknowledgement back to the gateway. The gateway then transmits a corresponding acknowledgement signal through the packet switching network to the trader trading station. The status line of the trader's monitor quadrant is then colored green to indicate that the call is on a queue at L Bank.

Figure 6B:
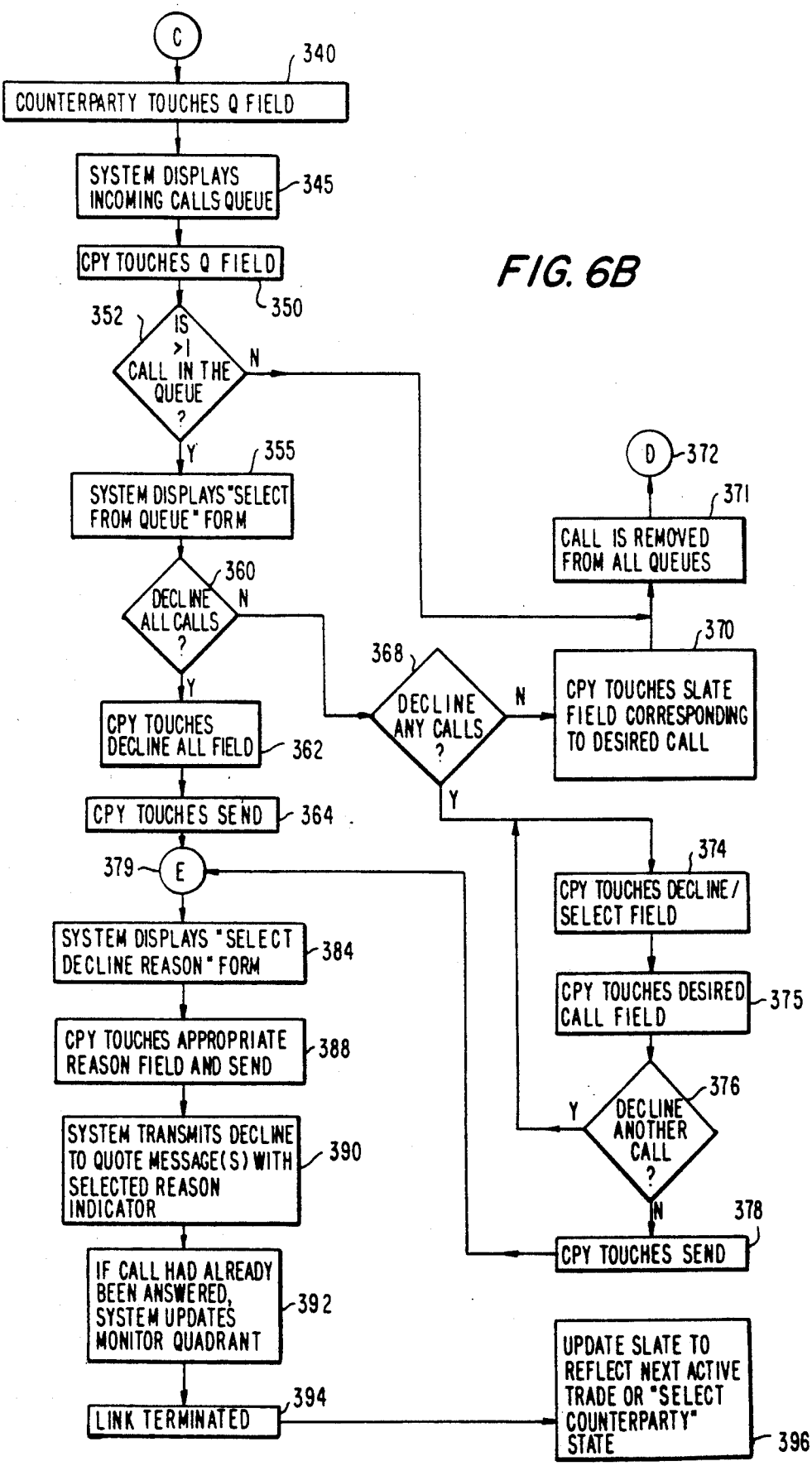

Assuming that a counterparty at the L Bank London site has logged onto the system and receives the call on his queue, he can answer the call if he has an available monitor quadrant. This step is indicated by the Answer Call block 162 of the Main Diagram shown in FIG. 5 and is described in detail in FIG. 6B. The counterparty's slate will be in either the SELECT COUNTERPARTY form or another form assumed during an active trade. In either case, the procedure for answering a call is the same. Assuming that the counterparty slate is in the SELECT COUNTERPARTY form shown in FIG. 7B, when one or more incoming quote requests are placed on the queue of a trading station, the trading station sounds an audible alarm such as a beep and the Q field 186 in the lower left corner of the slate begins flashing. To select a call from the queue, the counterparty must first be able to view the incoming calls queue on the monitor. If all four quadrants are displaying active trades and the queue is not displayed, the counterparty touches the Q field as indicated in block 340 to display the queue. This causes the Q field to stop flashing and the queue will appear in quadrant four as shown in FIG. 9 as indicated in block 345. The quadrant will appear as shown in FIG. 9 assuming that two calls are on the queue of the trading station.

Once the queue is displayed in a monitor quadrant, the counterparty touches the Q field as indicated by block 350 to select one of the incoming quote requests from the queue. If there is only one call on the queue, then touching the Q field will bring that call from the Incoming Calls Queue directly into the slate and remove the call from all queues as indicated by decision block 352, block 371 and the subsequent steps. If there is more than one call on the queue, the STP then directs the slate to appear in the SELECT FROM QUEUE form as indicated by block 355 and shown in FIG. 10. As shown in FIG. 10, the SELECT FROM QUEUE form has a field corresponding to each call on the queue. If an amount was sent with the quote request (as is not the case with the two quote requests shown in FIG. 10), the amount would be shown in the slate field. To select the call from the queue as represented by decision block 368, the counterparty touches the field corresponding to the desired call, as represented by block 370.

After the call is removed from all queues as represented by block 371, the transaction proceeds to the Send Quote stage 163 of the Main Diagram as indicated by the letter "D" 372. The Send Quote subroutine is described in greater detail in FIG. 6C.1. As indicated in block 400, the subroutine first checks to see if the quotation is needed to respond to an incoming request or to change an outstanding quote. If the routine has not been called by the change quote routine as is the case in this example, the program directs the counterparty trading station to compute its own value date for the transaction requested on queue line one using the local today's date and to determine if this value date matches the value date in the quote request as indicated by block 402. The program now updates the slate to appear in the PLEASE QUOTE form as indicated by block 403 and shown in FIG. 11B. However, if the two value dates matched, the VALUE field 204 of the slate, which enables the counterparty to enter a different value date upon touching the field, would not be displayed on the slate as is shown in FIG. 11B. The slate display includes the first name of the trader and the name and location of his institution. Three WE QUOTE fields, 200-202, are displayed. The first of these fields 200 is normally occupied by the Big Figure for the selected currency pair received from the L/A broadcast of the ticker feed.

The ticker feed is one of three inputs to the Holding Page of the trading station. The Holding Page receives input from the ticker feed, outgoing quotes and incoming quotes. For each currency pair, the Holding Page holds a Big Figure based on the most recently received information from any of these inputs. If the Big Figure is not part of the ticker feed and is not in the Holding Page, the Big Figure field is blank. The other two fields correspond to the bid 201 and offer 202 fields. The amount field 203 to the right of the currency pair is empty unless a dealt amount was sent with the quote request.

The STP uses the information in the quote request message to create the monitor quadrant display as indicated by block 404 and as shown in FIG. 11A. The monitor quadrant is displayed with a white foreground on a dark blue background. The color combination indicates the status of the transaction, while the colored background indicates to the counterparty that the other party is awaiting a response. If the two value dates did not match, the value date display on the monitor blinks on and off. As noted previously, if a maximum dealt amount had been sent with the quote request, the prompt line would read "PLEASE QUOTE ON UP TO STG 5,000,000" as opposed to what is shown in the monitor quadrant shown in FIG. 11A.

Referring again to FIG. 6B, once one of the traders at the counterparty site, such as Fred at L Bank London decides to accept the request, the call will disappear from the queues of all the counterparty trading stations that had accepted it, as indicated by block 371. It is possible that none of the traders at the counterparty site will desire or be able to answer or decline the quote request. In that event the quote request will simply remain on the queues of all the eligible traders at the counterparty site. However, the trader at ABC Bank who sent the request may cancel it at any time prior to its being answered by touching the CANCEL field 184 twice. The CANCEL field can be used to terminate any communication link at any stage of a transaction, provided the transaction is not in the proposal state (where a proposal has been sent) or any subsequent stage. However, a transaction that has reached the proposal stage can still be canceled if the proposal is CHANGEd and one of the parties touches CANCEL twice before a new proposal is received. Although the counterparty CANCEL field 184 is operable to terminate a communication link at any stage prior to the proposal stage of the trade, this option is not shown in the flow diagrams and will not be discussed further in describing the operation of system of the present invention because it is not used in the usual operation of the system to accomplish a trade.

The counterparty may then send a quote to the trading party or he may decline to quote. The counterparty may decline to quote by touching DECLINE/SELECT 199b from the SELECT FROM QUEUE slate display shown in FIG. 10 before answering the call or by touching DECLINE 199c from the PLEASE QUOTE display shown in FIG. 11B and as represented by decision block 412. In the former case, if the counterparty wants to decline a particular quote request, after touching DECLINE/SELECT 199b, the counterparty keys in the queue number of the quote request and then "E" as indicated by blocks 374 and 375 in FIG. 6B; if the counterparty wishes to decline another quote request, the procedure is repeated as indicated by decision block 376. The counterparty then touches SEND 196 as indicated by block 378. If the counterparty wishes to send decline messages for all the calls in the queue as indicated by decision block 360, just DECLINE/ALL 199a and then SEND 196 are touched as indicated by blocks 362 and 364. To decline a quote after answering a call, the counterparty touches DECLINE 199c and then SEND from the PLEASE QUOTE display as indicated by blocks 414 and 416 of FIG. 6C.1. Regardless of how a counterparty elects to send the decline signals, after SEND 196 is touched, the system calls the Select Decline Reason subroutine beginning at the point represented by the letter "E" 379. When this subroutine is called, the trading station slate displays the SELECT DECLINE REASON form as indicated by block 384 of FIG. 6B and shown in FIG. 12; the monitor quadrant remains the same as before the decline filed was touched. The counterparty is prompted to select a preprogrammed reason for declining by touching any of up to eight preprogrammed reasons such as LINE FULL, CLOSED FOR TODAY or NO INTEREST and then touching SEND as indicated by block 388. The decline reasons are programmed from the User Systems Administrator 98. If reason 2 206 is touched and then SEND 196, the selected communication is then sent to the trader and the communication link is then terminated as indicated by blocks 390-394. If the counterparty had answered the request that he declined to quote on, the monitor quadrant for the trade appears as shown in FIG. 13 with a magenta foreground on a black background to indicate that the trade has ended and the link has terminated as represented by block 392. Similarly, at the trader trading station at ABC Bank, the monitor quadrant will appear as in FIG. 10, but with a magenta foreground on a black background with the line that formerly read THEY WILL QUOTE replaced by DECLINED TO QUOTE BECAUSE: CLOSED FOR TODAY and the status line now reading QUOTE DECLINED/CALL ENDED. These displays will remain in both the trader and counterparty monitor quadrants until they are overwritten by another transaction or the incoming calls queue. The STPs at each trading station direct the respective slates to display the SELECT COUNTERPARTY display as exemplified by FIG. 7B or to reflect other active trades as indicated by block 396.

Referring again to FIG. 6C.1, if the counterparty at L Bank London decides to provide a quote while in the THEIR REQUEST FOR QUOTE stage as represented by block 412 and as shown in FIGS. 11A and 11B, he touches the appropriate number fields on the transaction keypad for the last two digits of the WE QUOTE bid and offer prices separated by a dash, and then the "E" field to enter the quote as indicated by block 428. As noted above, the counterparty usually need not enter the entire amounts for the bid and offer prices because, preferably, all but the final two digits of these figures are supplied to the trading station and displayed on the screen as the Big Figure. If this field is empty, or if the counterparty decides to change the displayed value, the counterparty can touch the Big Figure field and use the keypad to enter an amount as indicated by blocks 420, 422, 424 and 426. In a similar manner, the counterparty can change the contents of the bid, offer or amount fields. For example, the counterparty may touch "10-20" and then "E" 209. If this information was entered when the screen and slate appeared as they do in FIGS. 11A and 11B, a quote indicating that the counterparty is willing to buy the stated amount of British pounds at 1.6710 dollars per pound or to sell the same amount of British pounds for 1.6720 dollars per pound would be ready to be sent to the trader Joe at ABC Bank in New York.

The Currency Profile contains format rules for displaying the Big Figure, bid and offer fields for all possible currency pairs. These include rules indicating the number of digits to be displayed in each field. The STP will not permit an actual bid to be greater than an actual offer for spot quotes. If a bid field contains a number greater than the offer field, the STP treats this situation as if a one has been added to the least significant digit of the Big Figure for the offer price. For example, entering "99-02" for the bid and offer fields would cause 1.6799-02 to be displayed to the counterparty (and to the trader after the quote is transmitted). However, the system and traders would treat this display as representing a bid of 1.6799 and an offer of 1.6802 if and when an agreement is reached to buy or sell at one of these prices.

The flow of control now passes through point "F" 429 to FIG. 6C.2. The counterparty can enter an amount or change the amount in the amount field 203 by touching the field to highlight it and using the transaction keypad as represented by blocks 430, 432, 434, and 436. This procedure is simplified by using the "B" and "M" fields 206-208 on the transaction keypad shown in FIG. 11B to represent billions and millions, respectively. Thus to enter 5,000,000 one touches the desired field, and the "5", then "M" and then "E" to enter the amount in the highlighted field. The "C" field 210 on the keypad can be used to clear an entry before it has been entered. The system checks the entered amount against the stored dealt amount range from the profiles, as represented by block 437. If the newly entered amount is within the stored range values, control is passed to decision block 438 with the newly entered amount displayed in the amount field. If the newly entered amount is not within the stored range values as indicated by decision block 437, the system displays the PLEASE CONFIRM AMOUNT form in the slate as indicated by block 439 and as shown in FIG. 11C. This slate display prompts the trader to confirm the newly entered amount by touching either the YES or NO field displayed in FIG. 11C. If the counterparty confirms the new amount as represented by block 440, the system displays the PLEASE QUOTE slate form as indicated by block 442 and control is passed to decision block 438 with the newly entered amount displayed in the amount field of the slate display. If the trader does not confirm the amount, the slate display also returns to the PLEASE QUOTE state as indicated by block 441 and control is passed to decision block 438, but the newly entered amount is not displayed in the amount field. The amount field contains the same data that it contained prior to the attempt to change the amount.

Alternatively, the counterparty can leave the amount field blank or leave the amount received with the quote request in the field. Before transmitting the quote, the counterparty may alter the contents of the Big Figure, bid, offer or amount fields as indicated by decision block 438, which can pass control back to block 412 through point "G" 406. To transmit the quote, the counterparty touches SEND 196 as represented by block 443 of FIG. 6C.2. At this point the program uses the information in the Big Figure, bid, offer and amount fields 200-203 to prepare and transmit a quote message as indicated by blocks 444 and 446. The quote message is saved at the trading station as indicated by block 448.

If the counterparty entered "10-20" as his bid and offer, the monitor quadrant would appear as shown in FIG. 14A with a yellow foreground and a black background and the status OUR QUOTE OUTSTANDING as indicated by block 449. If an exact amount of STG 5,000,000 had been entered in the quote and the counterparty did not change the amount, the prompt line WE QUOTE in FIG. 14A would instead read WE QUOTE ON EXACT AMOUNT STG 5,000,000. If a maximum amount of STG 5,000,000 had been entered in the quote, and the counterparty did not change the amount, the prompt line would read WE QUOTE ON UP TO STG 5,000,000. Then the system returns the counterparty slate to the SELECT COUNTERPARTY state or the slate reflects an active trade as indicated by block 450.

The process of transmitting the quote from the counterparty trading station to the trader trading station as represented by block 446 is substantially similar to the transmission of a quote request discussed above. However, the outgoing quote is logged by the L/A computers at the counterparty site before the primary L/A sends the counterparty trading station an acknowledgement with a gateway address. Furthermore, upon reaching the gateway at ABC Bank, the transmission is now routed by the gateway to only the trader trading station that made the quote request and to the L/A computers so that the transmission can be logged. The gateway determines the appropriate trading station by accessing the addressed trader ID code field in the transmission and determining the appropriate trading station in the same manner described above. The receiving trading station determines which transaction, or quadrant, the incoming message pertains to by accessing the Session ID Number. All subsequent transmissions are performed in this manner, being logged at both sites.

Figure 6D:
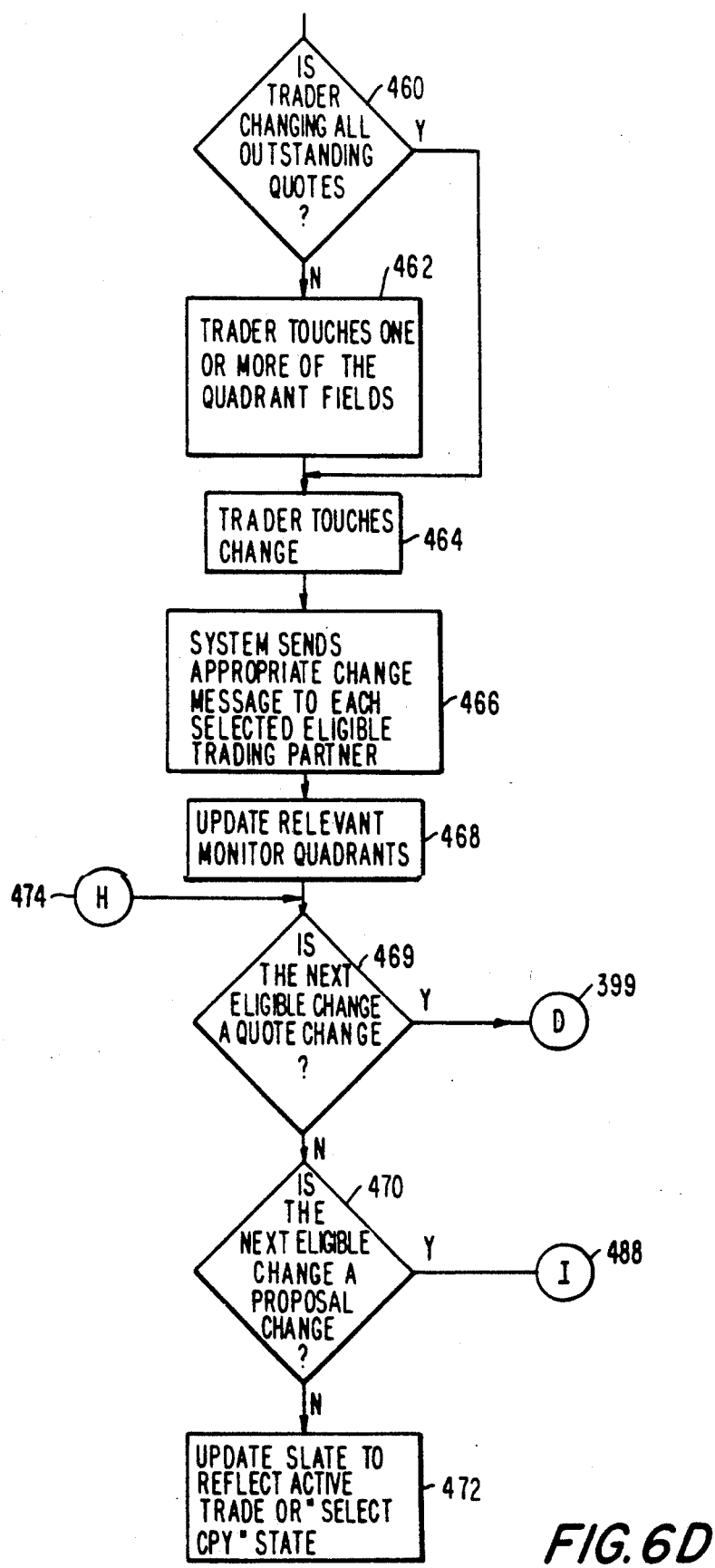

Referring again to FIG. 5, at any time after a quote is sent to a trader as indicated by block 163 but before the counterparty has received a proposal for a trade based on that quote as indicated by block 171, the STP allows the counterparty to change the outstanding quote by touching the CHANGE field 195 that appears on all trading slate displays. The counterparty can change a quote until a proposal by the trader is received by the counterparty trading station. As shown in detail in FIG. 6D, to change the quote, the counterparty can touch the quadrant field corresponding to the quadrant in which he desires to change the outstanding quote, as indicated by block 462 and then CHANGE as indicated by block 464. Alternatively, by simply touching CHANGE as indicated by decision block 460, all outstanding quotes in any of the quadrants will be marked as changing. When the counterparty touches the CHANGE field, the monitor quadrant of the counterparty appears as shown in FIG. 14B with a red foreground on a white background. When the trader trading station receives the CHANGE signal, the trader monitor quadrant has a white foreground and a red background and also indicates CHANGE above the currency pair symbols. This step is represented by block 468. Once the counterparty has touched CHANGE and then SEND, the trader will not be permitted to make a proposal based on the quote as the trader's slate reverts back to the SELECT COUNTERPARTY state. At this point, the transaction proceeds to decision block 469 and control is passed through point "D" 399 to the step represented by block 400 of FIG. 6C.1. Because this is a change to a quote, decision block 400 passes control to the step indicated by block 410, and the system accesses the stored two-way price and amount from the previously transmitted quote. Control is then passed to the step indicated by block 411, which loads the PLEASE CHANGE QUOTE form into the slate. This form is similar to that shown in FIG. 11B except for the different title and the contents of the bid, offer and amount fields 201-203 which now contain the amounts of the previously transmitted quote. From this point, the transaction proceeds as indicated in FIG. 6C.1, although the relevant monitor quadrants at both locations temporarily indicate that the quote is changing as indicated above. It should be noted that the CHANGE signal can be transmitted at any time when a quote or proposal is outstanding, and that the reception of a CHANGE signal at a receiving trading station interrupts and takes precedence over the program running on that trading station prior to the arrival of the CHANGE signal. After the new quote or proposal for the change is transmitted as represented by blocks 443 through 449 of FIG. 6C.2, the slate of the changing trader or counterparty reflects the next active trade or the SELECT COUNTERPARTY state as indicated by block 450. If more than one quote or proposal was changed, the next active trade is the second quote or proposal that was changed in the steps represented by blocks 460-464. Consequently, if more than one change was made, control is passed to a point represented by the letter "H" 474 in FIG. 6D so that the next changed quote or proposal can be sent. When all the changed quotes or proposals have been sent block 470 passes control to a point represented by block 472 because there are no longer any eligible changes to be processed. At this point, the slate of the changing trader or counterparty reflects the next active trade or the SELECT COUNTERPARTY state as indicated by block 472.

The operation of the system in receiving a quote as indicated by block 164 of FIG. 5 and as described in detail in FIG. 6E.1 will now be described. When a quote arrives at the requesting trader's trading station, the STP at that trading station initially calls the routine described in the flow diagram of FIG. 6E.1. The first step of this subprogram is to determine, as represented by block 490, whether this is an incoming quote or an outgoing change to a outstanding proposal. This is accomplished by accessing the Data Type field of the most recent message received or transmitted to determine the current status of the trade. In this case, there is an incoming quote, consequently, the monitor quadrant in which the quote request was displayed is updated to appear as shown in FIG. 15A with a black foreground on a yellow background as represented by block 494. If the trader is currently active in a trade in any one of the three other quadrants, the incoming quote awaits completion of the current and/or earlier arrival trade communications in the other quadrants. If a trader who is active in another quadrant wishes to act on the incoming quote immediately, he can select the quadrant in which the quote is displayed by touching the corresponding quadrant field 190-193 on the slate. The quadrant containing the incoming message can become active if no other quadrant is active when it arrives, if it is the next transmission to arrive after the transmission in a currently active quadrant when the trader finishes with the currently active quadrant, or if its quadrant is selected by the trader. The STP directs the slate display to reflect the status of the currently active quadrant. In the current description of the system and its operation, it will henceforth be assumed that all further transmissions arrive in the active quadrant of the receiving trading station.

When the quadrant with the incoming quote becomes the active quadrant, the slate appears in the PLEASE PROPOSE state as shown in FIG. 15B and as indicated by block 495. The Big Figure, Bid and Offer fields 200-202 contain the prices supplied by the counterparty, as indicated by block 496. The amount field 203 on the slate now contains an amount as indicated by block 500. This amount is either the amount sent by the counterparty, or if no amount was sent as indicated by decision block 498, a default dealt amount is supplied by the trader trading station, which the STP directs to check the Counterparty, Trader and Currency Profiles in that order to determine the correct default amount as represented by block 499. The STP uses the first amount found according to this procedure as the default dealt amount.

Upon receiving the quote, the trader may feel that the Big Figure of the quote no longer reflects the market price, as indicated by decision block 508. If the trader desires to check the Big Figure as indicated by the branch passing through point "J" 509, he touches the Big Figure field 200 to highlight it and touch SEND as indicated by blocks 532-534 of FIG. 6E.2. The trading station then transmits a "PLEASE CHECK BIG FIGURE" message to the counterparty as represented by block 535 and places the trader back in the OUR REQUEST FOR QUOTE status as described in block 536 and as shown above in FIG. 10. The trader slate returns to the SELECT COUNTERPARTY state or reflects an active trade indicated by block 538. The counterparty monitor quadrant, upon receiving the transmission becomes the same as shown in FIG. 11A, but with the status line now displaying THEIR REQUEST FOR QUOTE-CHECK BIG FIGURE; the counterparty slate appears as shown in FIG. 11B except that the field immediately to the left of the offer field now indicates PLEASE CHECK BIG FIGURE, in place of the VALUE field shown in FIG. 11B. The transaction then proceeds as indicated by the flow diagram in FIG. 6C.1 with the counterparty again in the PLEASE QUOTE state as represented by block 403.

Referring again to FIGS. 15B and 6E.1, the trader also has the option of not acting on the quote. If the trader does not wish to propose a deal and wishes to terminate the communication link as represented by decision block 510 and as indicated by the branch passing through point "K" 511, the trader can touch NOTHING/BYE 216 as represented by block 542 of FIG. 6E.2 to indicate that he does not wish to propose a deal and then touch SEND as indicated in block 544. The STP will then send a NO PROPOSAL/CALL ENDED signal to the counterparty as indicated by block 546 and these words will appear on the status line of both trader and counterparty monitor quadrants and cause the call to be terminated as indicated on the trader side by blocks 547-549. The communication link is then terminated as described previously in connection with blocks 392 and 394, with the monitor quadrant colors of both parties changing to magenta on a black background. The slate displays of both parties either show the SELECT COUNTERPARTY mode or reflect an active trade.

In a similar manner, the trader can decide to decline to propose and permit the counterparty to make a quote request as indicated by decision block 512 and as indicated by the branch passing through point "L" 513 by touching the NOTHING/ALLOW REQUEST field 214 and SEND as represented by blocks 552-554 of FIG. 6E.3 to transmit a NO PROPOSAL/AVAILABLE FOR REQUEST signal as indicated by block 556. This causes that message to be displayed in the status line of the monitor quadrants of both the trader and the counterparty. The trader's monitor quadrant then changes to a white foreground on a black background as represented by block 558; the counterparty's monitor quadrant shows black on a white background. The trader's slate display returns to the SELECT COUNTERPARTY state or reflects an active trade as indicated by block 559. The counterparty can then either terminate the link or request a quote. If the counterparty requests a quote, the transaction proceeds as described above with the original counterparty acting as the trader and the original trader acting as the counterparty for the new transaction.

Similarly, the trader can decide not to make a proposal on the quote, but to make another quote request as indicated by decision block 514 and by the branch passing through point "M" 515 by touching the NOTHING/ANOTHER REQUEST field 215 as indicated by block 562 of FIG. 6E.3. The trader can then select from the slate display SAME CURRENCY or ANOTHER CURRENCY. If SAME CURRENCY is selected, a NEW REQUEST FOR QUOTE is sent. If ANOTHER CURRENCY is selected, this action causes the trader's slate display to display the MODIFY CURRENCY DEFAULTS state as represented by block 564, which as discussed previously allows the trader to select another currency pair as denoted by block 566. The trader then touches SEND as indicated by block 567 to transmit a NEW REQUEST FOR QUOTE signal as represented by block 568. The transmitted message contains the new currency IDs. The trader slate reflects an active trade or returns to the SELECT COUNTERPARTY state. From this point, a new transaction proceeds as described from block 400 of FIG. 6C.1 above with the counterparty again in the PLEASE QUOTE state. The only differences from the operation as described above are that OUR/THEIR NEW REQUEST FOR QUOTE is displayed in the status lines of the respective monitor quadrants of the trader and the counterparty, and the currency symbols in the monitor quadrants are updated with the new currency pair.

Figures 15C, 15D:
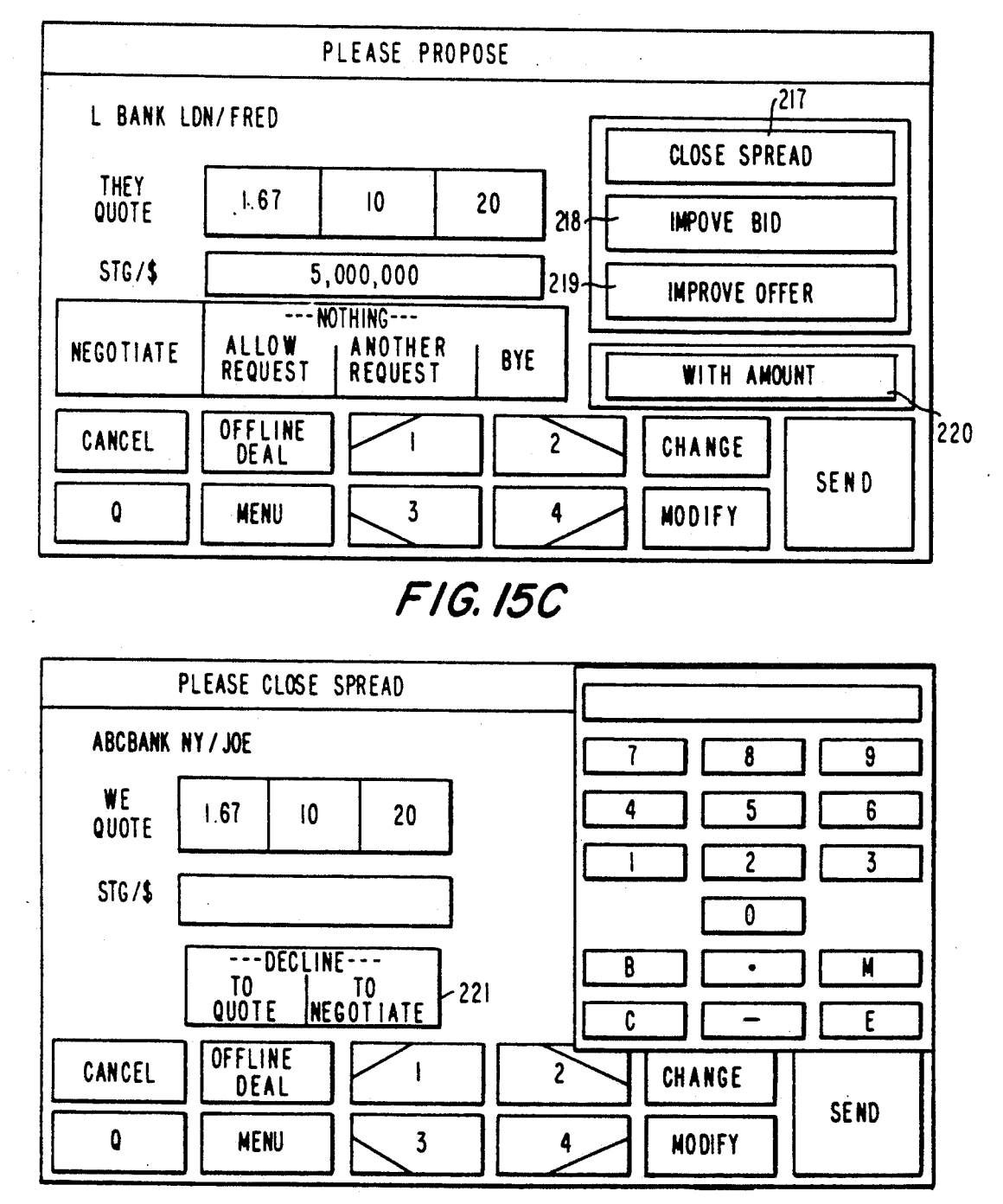

Alternatively, upon receiving a quote, the trader may wish to negotiate with the counterparty to induce him to improve his quote as indicated by block 165 of FIG. 5 and as represented by decision block 516 and the branch passing through point "N" 517. To negotiate, the trader touches the NEGOTIATE field 213 as indicated by block 576. Upon touching NEGOTIATE, the trader's slate displays a negotiating tool as indicated by block 578 providing three fields he can select from to induce the counterparty to improve his quote: CLOSE SPREAD 217, IMPROVE BID 218 or IMPROVE OFFER 219 as shown in FIG. 15C and as represented by block 578. The trader touches one of these three fields as indicated by blocks 580. The trader has the option of sending a dealt amount with these messages as indicated by decision block 586, which he can do by touching the WITH AMOUNT field 220 represented by block 587 causing a keypad to appear, as represented in block 588, to allow the trader to enter an amount as indicated by block 590 to be sent with the negotiation request. The system checks the entered amount against the stored dealt amount range, as represented by block 592 and makes the trader confirm the amount if it is not within the stored range as denoted by blocks 594 and 596. After touching one of the three negotiating options and possibly the WITH AMOUNT field, the trader touches SEND as described in block 600. The selected negotiation message is then transmitted by the system to the counterparty as indicated by block 604. If, for example, the trader touched CLOSE SPREAD 217 and then touched SEND, the trader's monitor would display THEIR QUOTE/NEGOTIATION OUTSTANDING on the status line and THEY QUOTE: PLEASE CLOSE SPREAD on the prompt line with a dark blue foreground on a white background. This change is denoted by block 606. In this example, the dealt amount would not be displayed or transmitted. The trader's slate returns to the SELECT COUNTERPARTY state or reflects an active trade as indicated by block 608.

Upon receiving the negotiation request transmission as indicated by block 166 of FIG. 5, the counterparty's monitor displays OUR QUOTE/ NEGOTIATION OUTSTANDING on the status line and WE QUOTE: PLEASE CLOSE SPREAD on the prompt line with a white foreground on a dark blue background. The counterparty's slate displays the PLEASE CLOSE SPREAD state as shown in FIG. 15D. The counterparty can touch DECLINE TO QUOTE which will change the slate to the SELECT DECLINE REASON state as shown in FIG. 12. The counterparty can then terminate the link in the same manner as previously described. The counterparty can also touch DECLINE TO NEGOTIATE 221 and SEND which transmits a quote message with no change from previously transmitted one to the trader. Alternatively, the counterparty can touch DECLINE TO NEGOTIATE and alter the quote to different values with the same or larger spread between the bid and the offer. The parties are then in the same state as when the trader first received the quote except that the status line on the counterparty monitor quadrant now reads OUR QUOTE/NEGOTIATION DECLINED, whereas the status line of the trader's monitor quadrant now reads THEIR QUOTE/NEGOTIATION DECLINED.

Alternatively, the counterparty may alter his quote or the amount as indicated by block 167 of FIG. 5 by using the displayed keypad to enter a new quote and touching SEND to transmit the new quote in a manner similar to that described above. If WITH AMOUNT was chosen in the negotiation request, the amount is displayed in the amount field shown in FIG. 15D and the altered quote entered by the counterparty is based on a transaction of the designated amount unless the counterparty changes the contents of the amount field. After the negotiated quote or the decline to negotiate is transmitted, the parties are in the same state as when a quote has just been transmitted as represented by block 490, except for the above noted changes in the status lines of the monitor quadrants of both parties to the trade.

Referring again to FIGS. 15B and 6E.1, upon receiving a quote or after one or more stages of negotiation, as denoted by block 168 of FIG. 5, the trader may wish to send a proposal as represented by block 170 and by decision block 518 of FIG. 6E.1 and the branch passing through point "O" 519. In making a proposal, the trader must decide whether to buy or sell the commodity as represented by decision block 610 of FIG. 6E.5. The trader may touch either the bid or offer field on his slate as indicated by blocks 612 or 614 to propose to sell or buy the amount of the commodity displayed on the slate. The selected bid or offer field 201 or 202 is then highlighted as indicated by block 616. If the trader desires, he can also propose a deal for an amount different from the amount displayed on the slate as indicated by decision block 620. The trader may propose a deal for a different amount as long as the amount sent with the quote was not requested at the "Please Quote" stage (i.e., the amount was a trader default amount transmitted with a quote request) as indicated by decision block 627 by touching the amount field as represented by block 622. If the trader sent an exact amount with his quote request, and that amount is now in the amount field, he can only propose a deal for that amount. Similarly, if a maximum amount was sent and that amount is now in the amount field, the trader may propose deals with only amounts less than or equal to this amount. If the trader attempts to alter the amount when he is not permitted to do so, the system simply displays the unchanged amount in the amount field. This causes a keypad to appear on the slate, as shown in block 624, that will allow the trader to enter a new amount that is different than the displayed amount as indicated by block 626. As with any newly entered amount, the STP checks the new amount against the lower and upper limit amounts stored in the Currency Profile as shown in block 628. If the entered amount is not within this range, the STP sounds an audible alarm and displays the slate display shown in FIG. 11C asking the trader to confirm the amount before transmitting the proposal as indicated by block 629. The trader must then either confirm or not confirm the amount as indicated by block 630. When the trader is satisfied as to the amount as described above in the steps represented by blocks 620-630, the trader then touches SEND as shown in block 631. The STP then checks the Data Type of the most recently transmitted or received message to determine if the proposal is in response to a proposal change as indicated by decision block 634. If the transmission is not made in response to a proposal change, the system must add a settlement instructions indicator, and possibly settlement instructions as well, to the proposal message.

The STP directs the trading station controller to access the Counterparty Profile corresponding to the selected counterparty to determine if standing settlement instructions exist for the counterparty. If standing instructions exist (meaning the parties to the trade already have the settlement instructions of the other party) the Instruction Type Indicator in the proposal message is set to "standing". If standing instructions do not exist, the Instruction Type Indicator is set to "usual", and the trader's usual instructions for the dealt and settled currencies are added to the proposal message. The system then transmits the proposal as represented by block 638.

Figure 16:
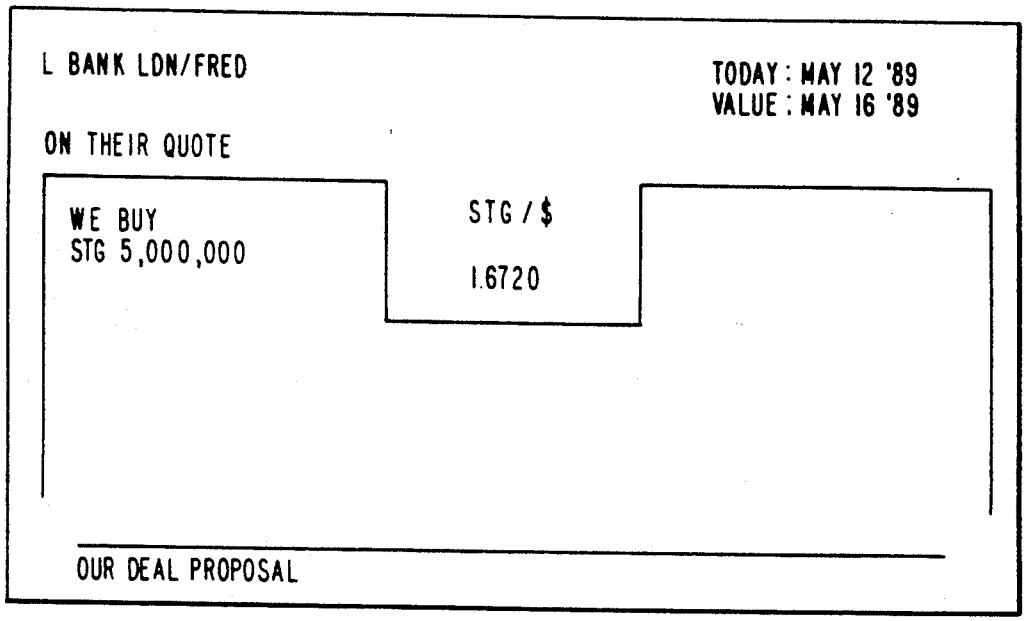
FIG. 16 is a diagrammatic illustration of a typical monitor quadrant display in the "Our Deal Proposal" state.

If, for example, the trader touches the offer field and then SEND, the monitor quadrant of the trader displays OUR DEAL PROPOSAL as shown in FIG. 16 with a green foreground on a black background. If the trader had also entered a new amount, the new amount would be displayed in the quadrant and the status line would read OUR DEAL PROPOSAL. This change is represented by block 639. The trader's slate returns to the SELECT COUNTERPARTY state or reflects an active trade as indicated by block 640.

At this point, a proposal has just been sent by the trader to the counterparty. In one embodiment of the system of the present invention, at any time after a proposal is sent to a counterparty but before the trader has received an acceptance of such proposal, the trader can CHANGE the outstanding proposal. To change the proposal, the trader touches the quadrant field corresponding to the quadrant in which he desires to change the outstanding proposal as indicated by block 462 of FIG. 6D and then touches CHANGE 195 as shown in block 464. The change is effective if it is sent before the trader trading station receives an acceptance based upon the proposal. If the change signal is not sent before the trader receives an acceptance based on the proposal, the change is not effective and will not be transmitted. The counterparty's acceptance message will then be displayed on the trader's monitor quadrant as will be described below, and touching the CHANGE field 195 will have no effect on that transaction. When the trader touches the CHANGE field, the STP directs the monitor quadrant of the trader to appear as it does in FIG. 16 except that the word CHANGE appears above the currency pair symbols, the status line now indicates OUR DEAL PROPOSAL CHANGING and the quadrant is now displayed as a red foreground on a white background. This step is represented by block 468. The STP then passes control of the trading station through the point represented by the letter "I" 488 to the step represented by block 490 of FIG. 6E.1. The trader slate displays the PLEASE CHANGE PROPOSAL state, as indicated by block 502, which is identical to the PLEASE PROPOSE display of FIG. 15B except for the different name for the slate form shown at the top of the slate display. The Big Figure, Bid and Offer fields contain the prices of the previously transmitted proposal as represented by block 504.

Figure 17:
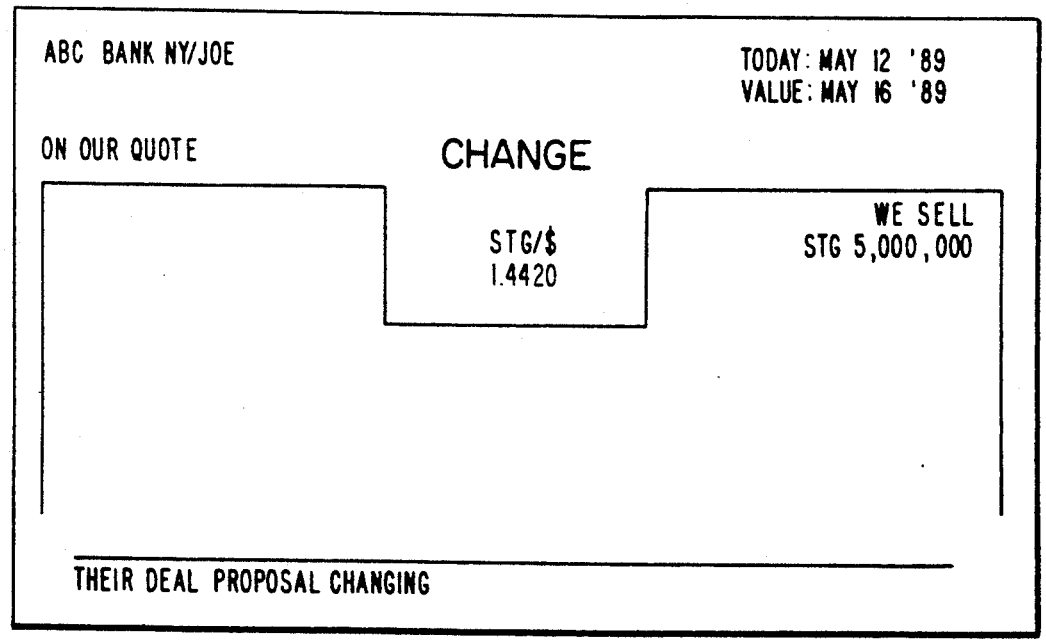
FIG. 17 is a diagrammatic illustration of a typical monitor quadrant display in the "Their Deal Proposal Changing" state.

Upon receiving the change proposal signal, the counterparty monitor quadrant appears as shown in FIG. 17 with a white foreground on a red background. The STP does not permit the counterparty to accept a proposal once a CHANGE signal is received by the counterparty trading station until the trader transmits the new, changed proposal. However, upon receiving a CHANGE message regarding a proposal, the counterparty can either change his quote by touching CHANGE or terminate the call by touching CANCEL twice. The reception of an effective change signal after a proposal has been transmitted interrupts and terminates the PLEASE ACCEPT state that the counterparty is in prior to receiving the change signal. At this point, the transaction proceeds through the Make Proposal stage as described in FIG. 6E.1. The monitor quadrants at both locations temporarily indicate that the proposal is changing. Once a new proposal is received by the counterparty, the counterparty may then accept the new proposal as will be described below, unless the trader changes the proposal again before the counterparty accepts it.

Figure 18A:
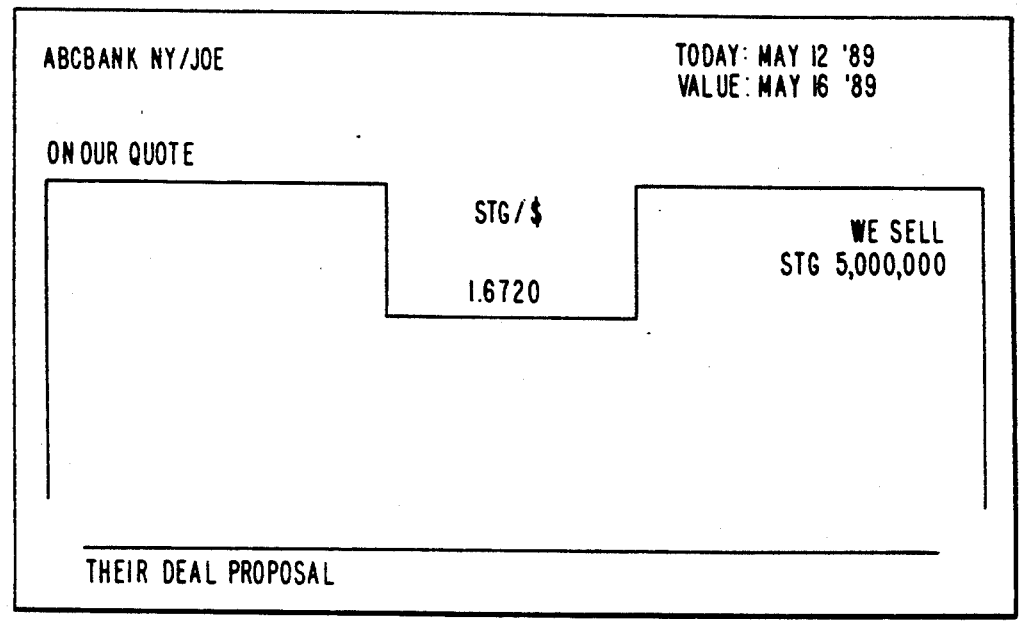
FIGS. 18A and 18B are diagrammatic illustrations of typical monitor quadrant and slate displays, respectively, in the PLEASE ACCEPT state.
Figure 18B:
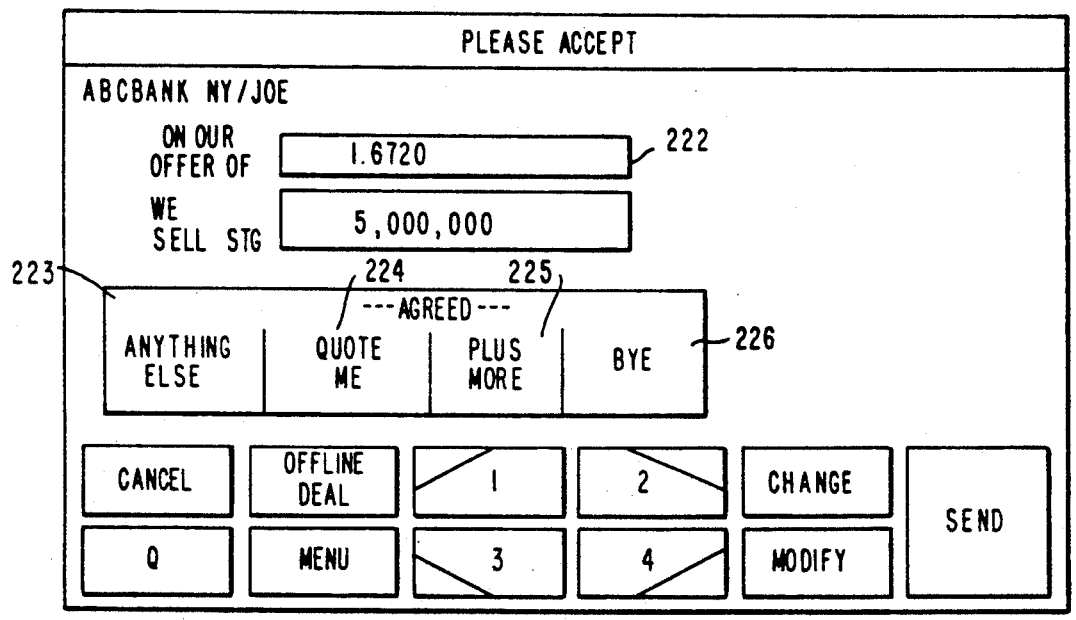

Once a proposal has been received by the counterparty as indicated by block 171 of FIG. 5, the counterparty must transmit an acceptance of it in some form, as represented by block 172, unless it is CHANGEd by the trader as described above. The counterparty does have the option of reducing the amount of the deal if he so desires, unless he quoted on a specific amount. If the counterparty quoted on a specific amount, he may not enter an amount less than the amount quoted on. Upon receiving the proposal described above, the STP updates the counterparty monitor quadrant to appear as shown in FIG. 18A with a black foreground on a green background as indicated by block 650 of FIG. 6F.1. The system then displays the PLEASE ACCEPT form in on the slate as indicated by block 651. The STP then determines if the received proposal requests acceptance of an additional amount as represented by decision block 652. In the present situation, the received proposal does not request acceptance of an additional amount as a transaction has not been completed yet. Consequently, the STP updates the counterparty slate display to appear as shown in FIG. 18B as represented by block 654. A Proposal Price field 222 is now displayed on the slate in place of the Big Figure, Bid and Offer fields; the Proposal Price field contains the full Bid or Offer price that the trader indicated in his proposal by touching either the Bid or Offer field. The STP displays the amount transmitted by the trader in his proposal in the amount field 203. The counterparty may wish to decrease the amount of the transaction as indicated by decision block 658 and by the branch passing through point "R" 659. To reduce the amount of the deal, the counterparty touches the amount field as indicated by block 680 of FIG. 6F.2 to bring up the keypad as shown in block 682. The counterparty then enters a decreased amount as shown in block 684. If the new amount exceeds the amount transmitted with the proposal, or if the new amount is less than an amount, if any, that was transmitted by the counterparty with the quote, the STP clears the amount and prompts the counterparty to enter a new amount as indicated by decision block 686 and block 688. If the entered amount is not within the lower and upper limits for the dealt amount in the Currency Profile as indicated by decision block 690, the STP will ask the counterparty to confirm the amount as indicated by blocks 692 and 694. When an acceptable amount has been entered, the slate returns to the PLEASE ACCEPT form displaying the newly entered amount as indicated by block 696, and control passes through the point represented the letter "T" 698 back into the loop of decision blocks shown in FIG. 6F.1.

To accept the proposal and terminate the communication link between the parties as represented by decision block 662, the counterparty can simply touch AGREED/BYE 226 as indicated by block 670 and then SEND as indicated by block 676. The system then prepares the acceptance message for transmission as represented by block 706. In this case the appropriate indicator is an end of transaction indicator. As with the trader prior to the transmission of the proposal message, the system determines if standing settlement instructions exist, and if they do, the settlement Instruction Type Indicator is set to "standing". If there are no standing instructions, the indicator is set to "usual" and the usual instructions for the dealt and settled currencies are accessed from the Currency Profile and added to the acceptance. This step is not performed if the acceptance is in response to an Accept Additional Proposal as indicated by blocks 708 and 710. The STP then transmits the acceptance to the trader as denoted by block 712. The STP then directs the counterparty monitor quadrant to appear as shown in FIG. 19 with a light blue foreground on a black background. The rate-settled amount which appears under WE BUY in FIG. 19 is calculated by the system using the agreed amount and the agreed exchange rate. The words STANDING INSTRUCTIONS in the figure are derived from the value in the Instruction Type Indicator. If the two parties have already exchanged settlement instructions through the system, the Instruction Type Indicator is set to "standing", so that "STANDING INSTRUCTIONS" appears in the quadrant; if settlement instructions have not already been exchanged, the usual instructions that the counterparty uses with the dealt and settled currencies involved are added to the message, the Instruction Type Indicator is set to "usual" and the instructions are sent along with the acceptance. In the latter case, the words USUAL INSTRUCTIONS will appear in the quadrant at this time. This updating of the monitor quadrant is represented by block 714. The counterparty slate returns to the SELECT COUNTERPARTY state or reflects an active trade as indicated by block 716. At this time the counterparty trading station waits for an acknowledgement from the trader trading station that the acceptance signal was received.

Once the acceptance signal has reached the trader trading station as represented by block 173 of FIG. 5, the trader STP directs the trader trading station to send an acknowledgement of receipt to the counterparty trading station as indicated by block 174. Once the acknowledgement signal has been sent, the STP directs the trader monitor quadrant to now display the settlement instruction type indication and the rate settled amount like the counterparty monitor quadrant shown in FIG. 19, and to change the display colors to a magenta foreground on a black background and to update the status line to now read DEAL COMPLETED & CONFIRMED.

Upon receiving the acknowledgement as represented by block 175, the counterparty STP updates the counterparty trading station monitor quadrant to appear as in FIG. 19, but now with a magenta foreground on a black background and the status line now reads DEAL COMPLETED & CONFIRMED. The counterparty gateway sends an acknowledgement signal back to the trader trading station as represented by block 176 to indicate that the first acknowledgement was received. The deal is then logged into the completed deals journal by the L/A computer at the counterparty site as indicated by block 177. When this acknowledgement is received by the trader trading station as represented by block 178, the link between the two trading stations is terminated. The deal is then logged into the completed deals journal by the L/A computer at the trader site as indicated by block 179. At both trading stations, the monitor quadrant displays will remain on the respective monitor quadrants until replaced by a subsequent transaction.

Figure 6F:
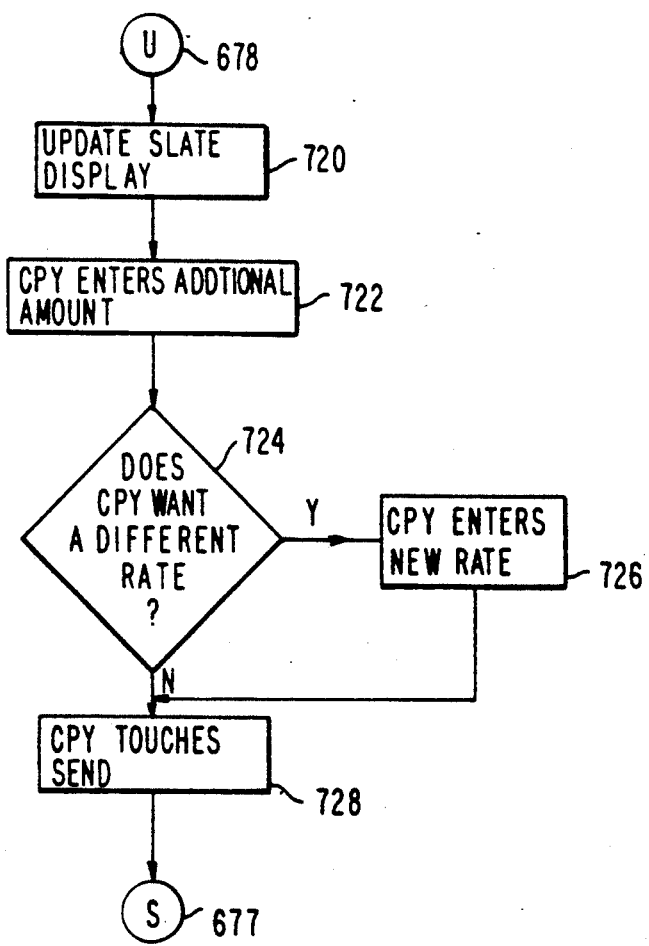
Figures 20A, 20B:
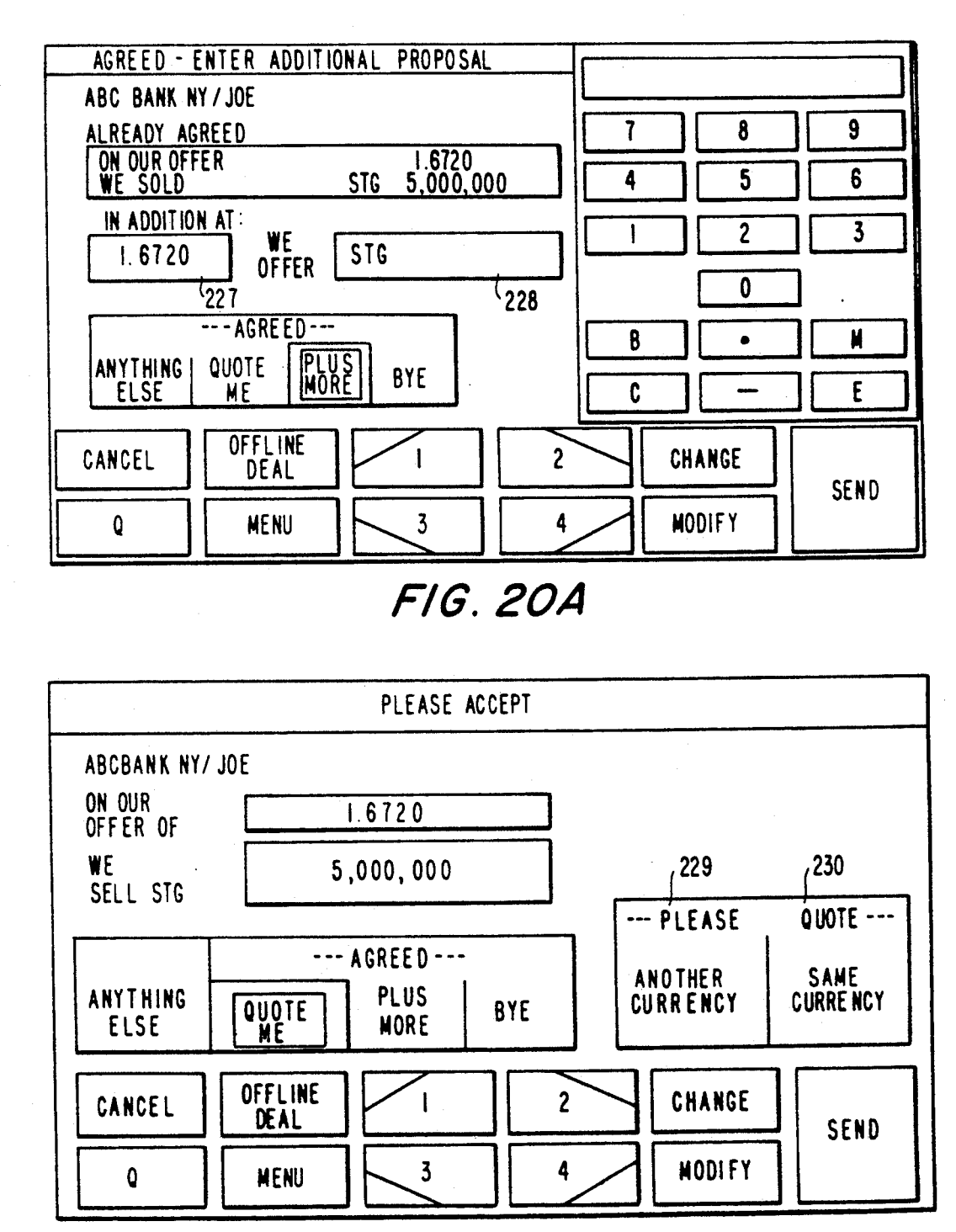

Referring again to the PLEASE ACCEPT slate display shown in FIG. 18B, the counterparty can also accept the proposal by touching either AGREED/ANYTHING ELSE 223, AGREED/QUOTE ME 224 or AGREED/ PLUS MORE 225 and then SEND. These activities correspond respectively to deciding to accept and allow a quote request as indicated by blocks 664 and 672, to deciding to accept and make a quote request as indicated by blocks 666 and 674, and to deciding to accept and proposing an additional transaction in the same commodity as indicated by blocks 660 and 668. All of these responses transmit acceptance with settlement instructions as needed to the trader and complete and confirm the deal as occurs when AGREED/BYE is selected; however, these three responses do not result in the automatic termination of the link between the two trading stations as described above. AGREED/ANYTHING ELSE permits the trader to make another quote request for another commodity after receiving the acceptance. AGREED/ PLUS MORE enables the counterparty to propose to buy or sell an additional amount of the same commodity while sending the acceptance. The counterparty cannot select AGREED/PLUS MORE if the proposed amount was decreased as indicated by block 669. If the counterparty touches AGREED/PLUS MORE and if he did not previously lower the amount, control passes through the point represented by the letter "U" and the system updates the slate display to appear as shown in FIG. 20A as indicated by block 720 of FIG. 6F.3. The counterparty can then enter the additional amount to be transacted in the additional amount field 228 as indicated by block 722, and optionally a new spot rate for the additional amount in the additional rate field 227 as represented by blocks 724 and 726 and then touch SEND as indicated by block 728. Control is then passed through the point represented by the letter "S" to FIG. 6F.2. The trader trading station, upon receiving the additional proposal updates the relevant monitor quadrant to reflect the acceptance and the additional proposal as indicated by block 650. The system then provides the agreed rate and amount plus the proposed additional rate and amount in the slate display and the transaction proceeds as indicated in FIG. 6F.1. If the counterparty touches AGREED/QUOTE ME, this changes the slate display to the form shown in FIG. 20B. This permits the counterparty to be act as a trader by sending a quote request for the same or a different currency pair to the original trader, making him a counterparty for a possible new transaction while sending his own acceptance for the concluded transaction. Touching PLEASE QUOTE/ANOTHER CURRENCY 129 causes the STP to display the MODIFY CURRENCY DEFAULTS form previously described. When the desired currency has been selected, the counterparty touches SEND. If PLEASE QUOTE/SAME CURRENCY 130 is touched, and then SEND, the STP transmits a quote request for the same currency to the other party.

Figure 6G:
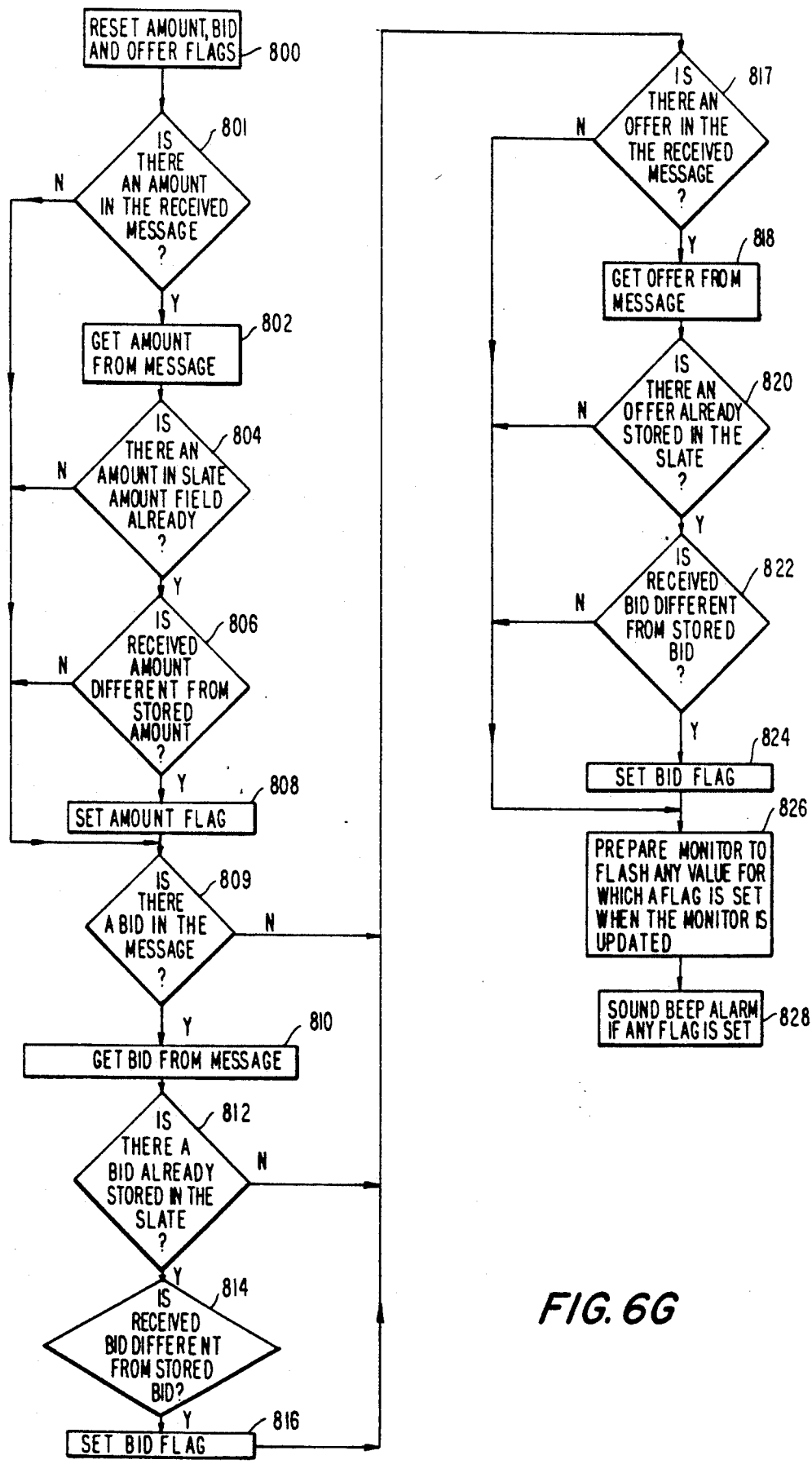

In the preferred embodiment, the system provides an indication to the trader or counterparty whenever a received response changes the values in the amount, bid or offer fields from the values that were in the fields in the previous stage of the transaction, if there were values in the fields at the previous stage of the transaction. To alert the trader or counterparty to the change, the trading station sounds an audible alarm when a signal has been received which changes a price in a quote, or the transactional amount or both. Additionally, to further highlight the change, the numbers displayed in the monitor quadrant that indicate the changed amount, bid or offer flash on and off. This process, which occurs immediately after a message is received, is shown in detail in FIG. 6G.

Because of the structure of the data messages of the system, all incoming messages which contain an amount, bid or offer are readily scanned to determine the amount, the bid price and the offer price. Upon receiving a message, the system resets the amount, bid and offer flags as represented by block 800; the STP then checks to see if an there is an amount in the message using the process described in connection with Tables A and B and FIG. 4, as indicated by decision block 801. If there is an amount figure in the received message, the STP retrieves this amount from the received message as indicated by block 802. The STP then accesses the amount field of the slate to determine if there is already an amount in that field as represented by block 804. If there is an amount already in the slate, the amount figure in the received message is compared to the amount figure in the amount field of the slate as indicated by decision block 806. If the STP determines that the two amount figures differ, the STP sets the amount indicator flag as indicated by block 808. This flag will not be set if there is no amount in the received message, if there is no amount already in the amount field of the slate or if the two amount values are the same, as indicated by decision blocks 801, 804 and 806 respectively.

This same process is repeated for the bid figure, as indicated by blocks 809-816 and for the offer figure, as indicated by blocks 817-824. However, the flags are reset only once, as indicated by block 800. When the process has been completed for the offer figure, the STP directs the subroutines controlling the monitor display to, upon updating the monitor quadrant, flash any figure for which a flag has been set on and off, as indicated by block 826. The STP does not actually create the monitor display at this time, as this is done immediately after the subroutine described by blocks 800-828 is completed. Finally, the STP directs the trading station to sound a beep if any of the flags were set, as indicated by block 828. At this point the STP determines the type of message that it has received (quote, proposal, etc.) and calls the appropriate subroutine. If the received message contained a proposal, control would be passed to block 490 shown in FIG. 6E.1.

For example, if a counterparty has quoted a price without indicating an amount, and the trader sends an Improve Offer message with an amount of 5,000,000 pounds sterling to induce the trader to improve his offer. In response to this negotiation request, the counterparty transmits a new quote with a changed offer price and an amount of 3,000,000 pounds sterling. When this response reaches the trader's trading station, the trading station will sound a beep and display the new quotation. The numbers in the associated monitor quadrant displaying the amount and the offer price blink on and off to indicate that both of these figures have changed. Thus the trader is instantly alerted to the changed offer price and amount. In this manner, whenever a message is received at a trading station, any transmitted values for the amount, bid and offer are checked against any values already in the respective field from the previous stage of the transaction, and any changes are signaled audibly and visually to the trader or counterparty.

As indicated above, the system of the present invention permits the transacting of up to four trades at one time on one trading station. While the monitor displays four quadrants, only one of these is active in a particular slate at any given time according to the time a given message making the trade active is received. A trader can optionally select an alternative active quadrant by touching one of the four quadrant fields that are displayed on the slate during all stages of trading. The structured framework of the present invention greatly facilitates a trader's ability to follow the progress of up to four trades at once by defining a limited number of stages a trade can be in and using a different color for each stage, as described above. The use of reverse video as described above further assists a trader by giving him a clearly visible indication of each trade for which it is his turn to respond. The structured framework further assists the trader by organizing information in each trade in a consistent format that the trader can become accustomed to; consequently, important information such as the negotiated price of a commodity is available at a glance because it always appears in the same area of a quadrant.

As noted above, after a transaction has been confirmed by the reception of acknowledgement signals by each party, the L/As of the each trading station's LAN log the completed transaction. Because the L/As have logged all transmitted and received messages The trading stations can also be directed to print out a ticket specifying the parties to the transaction and their respective obligations, the commodity and type of transaction, the amount of the transaction, and the settlement date and accounts to be used. Furthermore, the L/As can also be directed to transmit information regarding and characterizing each trade electronically to the trader or counterparty institution's in-house computer system through a computer interface.

While a specific embodiment of the system of the present invention has been described in detail, it must be noted that the scope of the present invention is by no means limited to this embodiment.

What is claimed is:

1. A data processing system for executing and characterizing trades among subscribers of specific ones of a selected group of commodities, said system comprising a group of trading stations including at least one trading station for each subscriber, each trading station being electronically coupled to said system to form a network, each of said trading stations comprising:

a. visual display means and input means for selection of certain fields from among an array of displayed fields including numerical data fields, to permit a trader to operate said system;
   b. communication initiation means initiate a communication link with a counterparty trading station of a selected subscriber in said network;
   c. first transmission means for transmitting from the initiating trading station a trading quotation request signal to said counterparty trading station, said quotation request signal comprising a commodity identification selected by the initiating trader, and an optional transactional volume amount which the initiating trader may select or elect not to transmit;
   d. acceptance means permitting a counterparty to accept from an initiating trading station over said link said quotation request signal;
   e. second transmission means for transmitting from said counterparty trading station to the initiating trading station selectively either a signal declining to quote or a quotation signal setting forth a bid price and an offer price for the identified commodity, and optionally a volume amount, said prices and volume amount being selected by the counterparty prior to transmission of said quotation signal;
   f. first reception means for receiving from the counterparty trading station either said signal declining to quote, which reception automatically terminates the transaction, or a quotation signal from the counterparty trading station over said link;
   g. third transmission means permitting only an initiating trading station that has received a quotation signal to transmit to the counterparty trading station over said link selectively, either a specific predetermined signal declining to make a proposal or a proposal signal proposing a trade in accordance with either the bid or offer term of said quotation signal for a volume amount selected by the initiating trading station prior to transmission of said proposal signal;
   h. second reception means permitting said counterparty trading station to receive from the initiating trading station either said signal declining to propose or a proposal signal from the counterparty trading station over said link;
   i. fourth transmission means permitting only a counterparty trading station that has received a proposal signal to transmit over said link a specific predetermined acceptance signal indicating acceptance of the proposal, said acceptance signal setting forth a volume amount for the transaction; and
   j. acknowledgement means for automatically sending an acknowledgement signal to the counterparty trading station upon receipt of said acceptance at the initiating trading station, receipt of said acknowledgement signal by the counterparty trading station indicating that the initiating trading station has received said acceptance.

2. A data processing system in accordance with claim 1, wherein each of said trading stations also includes means permitting a counterparty trading station, at any time after transmitting a quotation signal and before receiving a proposal signal in accordance with said transmitted quotation signal, to transmit a change quotation signal, said change quotation signal indicating a desire to change the terms of the previously transmitted quotation signal, and where each of said trading stations also includes third reception means for receiving said change quotation signal from a counterparty trading station, and upon receiving a change quotation signal, said initiating trading station third transmission means automatically being rendered unable to transmit a proposal signal to the counterparty trading station until said initiating trading station receives a new quotation signal from said counterparty after receiving said change quotation signal from said counterparty trading station, said proposal signal proposing a trade in accordance with either the bid or offer term of the new quotation signal received by the initiating trading station.

3. A data processing system in accordance with claim 1, wherein each of said trading stations also includes means permitting an initiating trading station, at any time after transmitting a proposal signal and before receiving an acceptance signal in accordance with said transmitted proposal signal, to transmit a change proposal signal, said change proposal signal indicating a desire to change the terms of the previously transmitted proposal signal, and where each of said trading stations also includes fourth reception means for receiving said change proposal signal from an initiating trading station, and upon receiving a change proposal signal, said counterparty trading station fourth transmission means automatically being rendered unable to transmit an acceptance signal to the initiating trading station until said counterparty trading station receives a proposal signal from said initiating trading station after receiving said change proposal signal from said initiating trading station, said transmitted acceptance signal indicating acceptance of the most recently received proposal.

4. A data processing system in accordance with claim 1, wherein each of said trading stations includes transmission means permitting an initiating trading station, upon receiving a quotation signal from a counterparty trading station, to transmit one of a limited number of fixed negotiation signals with or without a volume amount, each constituting a request to negotiate the terms transmitted in the quotation signal, and each of said trading stations further including fifth reception means for receiving from an initiating trading station said negotiation request signals.

5. A data processing system in accordance with claim 1, wherein each of said trading stations also includes termination means permitting either the initiating trading station or the counterparty trading station to terminate the communication link between the two trading stations until a proposal signal is received by or sent from said trading station.

6. A data processing system in accordance with claim 1, wherein said system includes at least one trading station capable of simultaneously carrying on up to four trades with any combination of up to four other trading stations on the network of trading stations.

7. A data processing system in accordance with claim 1, wherein, after a communication link has already been established between two trading stations and after a transaction has been completed or discontinued, a counterparty trading station may function as an initiating trading station by transmitting a quotation request signal to the original initiating trading station, and the original initiating trading station may function as a counterparty trading station.

8. A data processing system in accordance with claim 1, wherein at least one of said trading stations includes a graphics slate input device, said graphics slate comprising a screen display with a touch sensitive overlay, said slate allowing a trader to input data and commands by touching said touch sensitive overlay at a location immediately above the desired field displayed on said slate screen, said slate screen displaying various forms at different stages of a transaction, each form comprising a fixed array of data input and command fields.

9. A data processing system for executing and characterizing trades among subscribers of specific ones of a selected group of commodities, said system comprising a group of trading stations including at least one trading station for each subscriber, each trading station being electronically coupled to said system to form a network, said network transmitting data messages from a transmitting trading station to a receiving trading station to enable any two trading stations in said network to carry out a transaction in a series of transactional stages, said data messages containing one of a limited number of data message type identifiers, where at each particular stage of the transaction, a trading station is capable of selectively transmitting a data message containing one of only a subset of data message type identifiers, said subset not including every data message type identifier that the trading station is capable of transmitting in the course of an entire transaction, each stage of the transaction consequently having a corresponding subset of data message type identifiers which a trading station presently in that stage may transmit, where the transmission of a data message containing a data message type identifier causes the transmitting trading station to enter into another transactional stage, and the reception of the message containing said data message type identifier causes the receiving trading station to enter into another transactional stage.

10. A data processing system in accordance with claim 9, wherein data messages transmitted by said system comprise various fields, each message containing a data message type field in a predetermined location in said message, said data message type identifier located in said data message type field.

11. A data processing system in accordance with claim 10, wherein each data message type identifier further corresponds to a predetermined message format, said predetermined message format comprising a predetermined arrangement of fields, each field of a predetermined length and each field corresponding to a predetermined information category, each trading station including determination means permitting a receiving trading station to determine the data message type identifier of the incoming message, each trading station further including determination means to determine, based on the data message type identifier, the corresponding information category for each field in the received message.

12. A data processing system in accordance with claim 11, wherein each trading station includes storage means for storing, for a given transaction, data indicating at least the identity of the commodity sold in the transaction, the agreed volume of the transaction, the agreed price of the commodity, the identity of the other party to the transaction, and whether the operator of the trading station agreed to buy or sell the commodity in the transaction.

13. A data processing system in accordance with claim 9, wherein at least one of said trading stations includes a graphics slate input device, said graphics slate comprising a screen display with a touch sensitive overlay, said slate allowing a trader to input data and commands by touching said touch sensitive overlay at a location immediately above the desired field displayed on said slate screen, said slate screen displaying various forms at different stages of a transaction, each form comprising a fixed array of data input and command fields.

14. A data processing system for executing and characterizing trades among subscribers of specific ones of a selected group of commodities, said system comprising a group of trading stations including at least one trading station for each subscriber, each trading station being electronically coupled to said system to form a network, said network transmitting data messages including at least one data field, from a transmitting trading station to a receiving trading station to enable any two trading stations in said network to carry out a transaction in a series of transactional stages, said system including a change alert subsystem, said change alert subsystem comprising:
  signal processing means for scanning messages received at a trading station to determine if the message contains a specified data field;
  means for retrieving the contents of the specified data field if the message contains the specified data field;
  means for logically comparing the contents of the specified data field with the contents, if any, of a specified memory location in which the contents of a corresponding data field from a message that was previously sent from or received at said trading station during the transaction has been stored; and
  means for sounding an audible alarm if the contents of the specified data field differs from the contents, if any, of the specified memory location.

15. A data processing system for executing and characterizing trades among subscribers of specific ones of a selected group of commodities, said system comprising a group of trading stations including at least one trading station for each subscriber, each trading station being electronically coupled to said system to form a network, said network transmitting data messages including at least one data field, from a transmitting trading station to a receiving trading station to enable any two trading stations in said network to carry out a transaction in a series of transactional stages, said system including a change alert subsystem, said change alert subsystem comprising:

signal processing means for scanning messages received at a trading station to determine if the message contains a specified data field;

means for retrieving the contents of the specified data field if the message contains the specified data field;

means for logically comparing the contents of the specified data field with the contents, if any, of a specified memory location in which the contents of a corresponding data field from a message that was previously sent from or received at said trading station during the transaction has been stored; and means for displaying a visual change indication if the contents of the specified data field differs from the contents, if any, of the specified memory location.

* * * * *